(12) United States Patent
Hiura et al.

(10) Patent No.: US 7,353,719 B2
(45) Date of Patent: Apr. 8, 2008

(54) PRESSURE SENSOR AND METHOD FOR FABRICATING THE SAME

(75) Inventors: Sayaka Hiura, Tottori (JP); Takao Yamauchi, Tottori (JP); Kaoru Taketa, Tottori (JP); Koji Yoshida, Tottori (JP); Masaki Endo, Tottori (JP)

(73) Assignee: Seiko Epson Corporation, Tokyo (JP)

( * ) Notice: Subject to any disclaimer, the term of this patent is extended or adjusted under 35 U.S.C. 154(b) by 98 days.

(21) Appl. No.: 10/507,687

(22) PCT Filed: Mar. 27, 2003

(86) PCT No.: PCT/JP03/03899
§ 371 (c)(1),
(2), (4) Date: Jul. 8, 2005

(87) PCT Pub. No.: WO03/083425

PCT Pub. Date: Oct. 9, 2003

(65) Prior Publication Data
US 2005/0284229 A1 Dec. 29, 2005

(30) Foreign Application Priority Data

| Mar. 28, 2002 | (JP) | ............................ 2002-091242 |
| Mar. 29, 2002 | (JP) | ............................ 2002-094965 |
| Mar. 29, 2002 | (JP) | ............................ 2002-094966 |
| Mar. 29, 2002 | (JP) | ............................ 2002-094972 |
| Sep. 10, 2002 | (JP) | ............................ 2002-264373 |

(51) Int. Cl.
*G01L 1/00* (2006.01)

(52) U.S. Cl. .............................. 73/862.046; 29/25.41; 73/862.68; 73/862.256

(58) Field of Classification Search .................. 73/753, 73/862.68, 862.046, 862.625, 723, 717; 257/417, 257/419, 254; 29/25.41; 438/53
See application file for complete search history.

(56) References Cited

U.S. PATENT DOCUMENTS 4,345,299 A * 8/1982 Ho ........................... 361/283.4

(Continued)

FOREIGN PATENT DOCUMENTS

| EP | 982576 A1 * | 3/2000 |
| JP | 04065645 A * | 3/1992 |
| JP | 7-83776 | 3/1995 |
| JP | 10068663 A * | 3/1998 |

OTHER PUBLICATIONS

Padmanabhan, A., "Silicon Micromachined Sensors and Sensor Arrays for Shear Stress Measurements in Aerodynamic Flows," Ph.D. Dissertation, Dept. of Mechanical Engineering, Massachusetts Inst. of Technology, Cambridge, MA, Jan. 1997. Accessed online Dec. 11, 2006 at http://raphael.mit.edu/Technical_Reports/Padmanabhan_Thesis.pdf.*

*Primary Examiner*—Michael Cygan
*Assistant Examiner*—Punam Patel
(74) *Attorney, Agent, or Firm*—Arent Fox LLP

(57) ABSTRACT

A pressure sensor comprising a plurality of sensor parts arranged in matrix. A first electrode being connected with first wiring and a second electrode being connected with second wiring are disposed oppositely through a cavity part in the sensor part. The second electrode bends to the first electrode side in response to a pressure from a specimen and touches the first electrode upon application of a pressure of a specified level or above. When the specimen is pressed against a pressure detecting region, both electrodes touch each other at a sensor part corresponding to a protrusion of the specimen and are separated at a sensor part corresponding to a recess. When a scanning signal is fed from a scanning circuit to one wiring and presence of a signal flowing through the second wiring is detected by a sensing circuit, a pressure being applied to each sensor part can be detected. Furthermore, the shape is detected by feeding the scanning signal from the scanning circuit to each first wiring sequentially and scanning the pressure detecting region generally.

17 Claims, 22 Drawing Sheets

U.S. PATENT DOCUMENTS

| | | | |
|---|---|---|---|
| 4,492,949 A * | 1/1985 | Peterson et al. | 338/114 |
| 4,640,137 A * | 2/1987 | Trull et al. | 73/862.046 |
| 5,014,224 A * | 5/1991 | Hans | 338/99 |
| 5,277,067 A * | 1/1994 | Holland et al. | 73/723 |
| 5,471,723 A * | 12/1995 | Luder et al. | 29/25.41 |
| 6,109,113 A | 8/2000 | Chavan et al. | |
| 6,122,973 A * | 9/2000 | Nomura et al. | 73/724 |
| 6,640,643 B2 * | 11/2003 | Ishio et al. | 73/718 |
| 6,889,565 B2 * | 5/2005 | DeConde et al. | 73/862.042 |
| 7,092,539 B2 * | 8/2006 | Sheplak et al. | 381/114 |
| 2003/0019299 A1 * | 1/2003 | Horie et al. | 73/718 |
| 2005/0172722 A1 * | 8/2005 | Kobayashi et al. | 73/754 |
| 2005/0199969 A1 * | 9/2005 | Kobayashi et al. | 257/414 |

* cited by examiner

PRESSURE SENSOR AND METHOD FOR FABRICATING THE SAME

CROSS-REFERENCE TO RELATED APPLICATION

This application is a National Stage entry of International Application No. PCT/JP03/03899, filed Mar. 27, 2003, the entire specification claims and drawings of which are incorporated herewith by reference.

TECHNICAL FIELD

The present invention relates to a pressure sensor and, more particularly, to a sensor for detecting a fine pattern.

BACKGROUND ART

A finger print sensor has been conventionally employed as an individual identification device, and a requirement for the finger print sensor is detection of a finger print with simplicity and good precision. Various types of finger print sensors of this kind have been studied and developed, which include a type to detect a finger print optically, a type to detect a finger print electrically, and the like. JP-A 09-126918 (1997) and JP-A 10-300610 (1998) describe, for example, that microsensor sections having electrodes are arranged in a matrix, wherein a pressure from a finger is converted into an electric signal to thereby detect a finger print. The microsensor sections each are constructed such that two electrodes are disposed opposite each other with a cavity present therebetween.

FIG. 18 is a sectional view of a microsensor section in fabrication process. An etching barrier layer 102 is stacked on a silicon substrate 101 and a first metal layer 103 made of Au or Ti is formed thereon in a predetermined pattern. The first metal layer 103 is used as a first electrode of a variable capacitor or a first terminal of a microcontactor. A separation film 104 made of polycrystalline silicon or Al is formed on and covers the first metal layer 103, and a second metal layer 105 made of Au or Ti is formed on the separation film 104. An insulating film 106 made of silicon nitride covers all over the surface of the substrate 101. An opening 107 reaching as far as the separation film 104 is formed on the surface of the microsensor section through the second metal layer 105 and the insulating film 106 to expose the separation film 104 to the outside in the opening 107. Note that this state is shown in FIG. 18. Thereafter, wet etching is applied to the substrate 101, in which a solution etches the separation film 104 made of polycrystalline silicon or Al to remove the separation film 104 and to form a cavity. After the etching, the opening 107 is closed with silicon nitride or the like to hermetically seal the cavity. When a pressure from a finger is imposed on the microsensor, the insulating film 106 and the second metal layer 105 is curved to the first metal layer 103 side depending on the pressure, to which situation an electric signal is outputted in response to thereby detect a pattern of a finger print.

Generally, if the opening 107 of the microsensor section is kept open, dust or the like intrudes into the cavity through the opening 107 to cause a malfunction, which, makes it better to close the opening 107. In a case where a step of stacking an insulating film, for example, by means of plasma CVD after the opening is closed, however, a microsensor is inevitably placed in a vacuum in a fabrication process thereof. In this situation, there arises a difference between air pressures in the cavity and the outside since the cavity is hermetically sealed, which imposes a great load on the second metal layer 105, resulting in a problem to break down the microsensor section.

DISCLOSURE OF THE INVENTION

The present invention has been made in light of the above problems, and it is an object of the present invention to provide a pressure sensor preventing breakage of a sensor section in fabrication to thereby increase a product yield.

In order to achieve the above object, the present invention is directed to a pressure sensor including: plural first wires and plural second wires intersecting with each other in arrangement; and plural sensor sections provided in the vicinities of the intersections of the both wires, wherein in each of the sensor sections, a first electrode and a second electrode, which is so formed as to bend toward the first electrode when a pressure is applied to the sensor section, are disposed opposite to each other with a cavity interposed therebetween, the plural sensor sections are arranged in a pressure detection region, and the cavities in the respective sensor sections disposed along the column direction communicate spatially with each other.

The present invention is also directed to the pressure sensor with the above construction, wherein a release hole is provided at each of communication portions causing the cavities of the respective sensor sections to communicate with each other.

The present invention is also directed to the pressure sensor with the above construction, wherein two communication portions are provided between sensor sections adjacent to each other.

The present invention is also directed to the pressure sensor with the above construction, wherein each of the sensor sections has a circular release hole penetrating through a film serving as an upper surface of the cavity.

The present invention is also directed to the pressure sensor with the above construction, wherein the communication portions are made of the same material as electrodes in the sensor sections, connected to the communication portions.

The present invention is also directed to the pressure sensor with the above construction, wherein the sensor sections are disposed at a site spaced apart from the respective corresponding intersections of the first wires and the second wires.

The present invention is also directed to the pressure sensor with the above construction, wherein the second electrodes of adjacent sensor sections have a connection portion for electrically connecting between the second electrodes.

The present invention is also directed to the pressure sensor with the above construction, wherein the first electrodes of adjacent sensor sections have a connection portion for electrically connecting between the first electrodes.

The present invention is also directed to a pressure sensor provided with plural sensor sections in each of which a first electrode and a second electrode are disposed opposite to each other with a cavity interposed therebetween, the plural sensor sections being arranged in a pressure detection region, the pressure sensor including: a vent hole section provided separately from the sensor sections and, also, having a vent hole at a surface thereof, and a communication path for communicating the cavity of a sensor section spatially with the vent hole of the vent hole section.

The present invention is also directed to the pressure sensor with the above construction, wherein the communication path has a bend.

The present invention is also directed to the pressure sensor with the above construction, wherein the communication path is formed in a zigzag fashion.

The present invention is also directed to the pressure sensor with the above construction, wherein the communication path is formed in a spiral fashion.

The present invention is also directed to the pressure sensor with the above construction, wherein each of the sensor sections has a circular release hole penetrating through a film serving as an upper surface of the cavity.

The present invention is also directed to the pressure sensor with the above construction, wherein the vent hole section has a polygonal vent hole penetrating through a film serving as an upper surface of the vent hole section.

The present invention is also directed to the pressure sensor with the above construction, wherein the vent hole section has a tetragonal vent hole penetrating through a film serving as the upper surface of the vent hole section.

The present invention is also directed to the pressure sensor with the above construction, wherein the plural sensor sections are arranged in a matrix, and the vent hole section is disposed outside a region in which the sensor sections are arranged.

The present invention is also directed to the pressure sensor with the above construction, wherein at least one of the inner surfaces of the communication path is formed with the same material as an electrode of the corresponding sensor section.

The present invention is also directed to the pressure sensor with the above construction, wherein an inner surface of the communication path is made of an insulating film.

The present invention is also directed to the pressure sensor with the above construction, wherein the second electrodes of adjacent sensor sections have a connection portion for electrically connecting between the second electrodes.

The present invention is also directed to the pressure sensor with the above construction, wherein the first electrodes of adjacent sensor sections have a connection portion for electrically connecting between the first electrodes.

The present invention is also directed to a method for fabricating a pressure sensor provided with plural sensor sections each having a cavity in arrangement, and a communication portion causing the cavities of adjacent sensor sections to communicate spatially with each other, the method including the steps of: stacking a metal layer on a substrate to form a first electrode at a site corresponding to a sensor section; stacking a first insulating film on first electrodes; removing part of the first insulating to expose a central portion of each of the first electrodes; stacking an intermediate layer formed with a metal layer on the first insulating film; patterning the intermediate layer to leave behind the central portions of the sensor sections and portions corresponding to communication portions; stacking a metal layer on the intermediate layer to pattern the metal layer so as to cover at least the intermediate layer on the sensor sections and the communication portions and to form second electrodes in the sensor sections; forming a second insulating film on the second electrodes; removing parts of each of the second electrodes; and the second insulating film positioned on the intermediate layer to form release holes of the sensor sections; removing the intermediate layer through the release holes to form the cavities in the sensor sections and the communication portions; and closing the release holes with an insulating film.

The present invention is also directed to a method for fabricating a pressure sensor provided with plural sensor sections each having a cavity in arrangement, and a communication portion causing the cavities of adjacent sensor sections to communicate spatially with each other, the method including the steps of: stacking a metal layer on a substrate to form a first electrode at a site corresponding to a sensor section; stacking a first insulating film on first electrodes; removing part of the first insulating to expose a central portion of each of the first electrodes; stacking an intermediate layer formed with a metal layer on the first insulating film; patterning the intermediate layer to leave behind the central portions of the sensor sections and portions corresponding to communication portions; stacking a metal layer on the intermediate layer to pattern the metal layer so as to cover at least the intermediate layer on the sensor sections and the communication portions and to form second electrodes in the sensor sections; forming a second insulating film on the second electrodes; removing parts of each of the second electrodes and the second insulating film positioned on the intermediate layer to form release holes of the sensor sections; removing the intermediate layer through the release holes to form the cavities in the sensor sections and the communication portions; and closing the release holes with an insulating film.

BEST MODE FOR CARRYING OUT THE INVENTION

Figure 1:
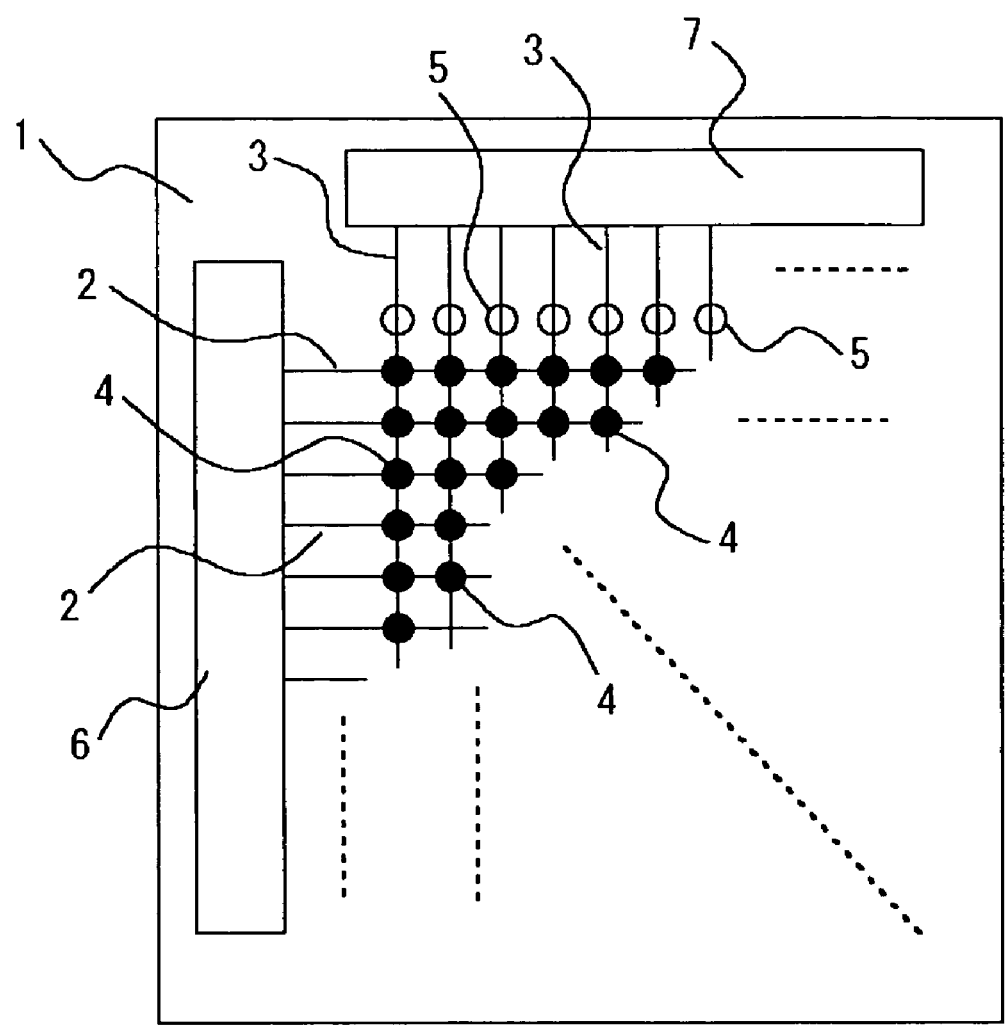
FIG. 1 is an overall view schematically showing pressure sensors according to a first embodiment of the present invention.

Description will be given of a first embodiment of the present invention with reference to the accompanying drawings. FIG. 1 is an overall view schematically showing pressure sensors of the present invention. A numerical symbol 1 indicates a transparent glass substrate, and intersections between plural first wires 2 extending in the row direction and plural second wires 3 extending in the column direction are arranged in a matrix on the glass substrate 1. In this embodiment, while the glass substrate 1 is used as a substrate, a plastic film or the like may also replace it without imposing specific limitation on the glass substrate. A numerical symbol 4 indicates sensor sections each disposed in the vicinity of intersections of the first wires 2 and the second wires 3, and a numerical symbols 5 indicates vent hole sections provided on the respective second wires 3. A region in which the plural sensor sections 4 are arranged in a matrix corresponds to a pressure detection region, which detects a fine pattern, and the vent hole section 5 is provided outside the pressure detection region. Note that there is provided a region for detecting a pattern in a pressure sensor device in which sensor sections 4 are assembled, and the term "pressure detection region" herein means not a region for detecting a pattern in the pressure sensor device, but a region in which the sensor sections 4 exist. The vent hole sections 5 are located on respective extensions in the column direction along which the sensor sections 4 are disposed, wherein two vent hole sections are disposed at both ends of each sensor section group disposed in a line along the column direction. Note that one vent hole section 5 may be disposed adjacent to one end of each sensor group in a line. A numerical symbol 6 indicates a scanning circuit for supplying a scanning signal to the first wires 2, and a numerical symbol 7 indicates a sensing circuit for detecting a signal flowing in the second wires 3.

In the sensor section 4, a detailed construction of which will be described later, a first electrode connected to the first wire 2 and a second electrode connected to the second wire 3 are disposed opposite to each other with a cavity interposed therebetween. The second electrode is curved to the first electrode side so as to match a pressure from a specimen to be eventually brought into contact with the first electrode when a pressure of a predetermined value or more is applied. When the specimen is pushed to the pressure detection region, both electrodes are brought into contact with each other in a sensor section 4 corresponding to a protrusion of the specimen, while both electrodes are kept separated from each other in a sensor section 4 corresponding to a depression of the specimen. If in this situation, a scanning signal is supplied to one of the first wires 2 from the scanning circuit 6, the signal flows into a second wire 3 through both electrodes in a sensor section 4 in which both electrodes are brought into contact, while no signal flows into a second wire 3 in a sensor section 4 in which both electrodes are not brought into contact. Then, if the presence/absence of the signal flowing through a second wire 3 is detected in the sensing circuit 7, pressures imposed on each of the sensor sections 4 can be detected. A scanning signal is supplied sequentially to the first wires 2 from the scanning circuit 6 to thereby scan all of the pressure detection region with the signal once and to detect a pattern.

Figure 2:
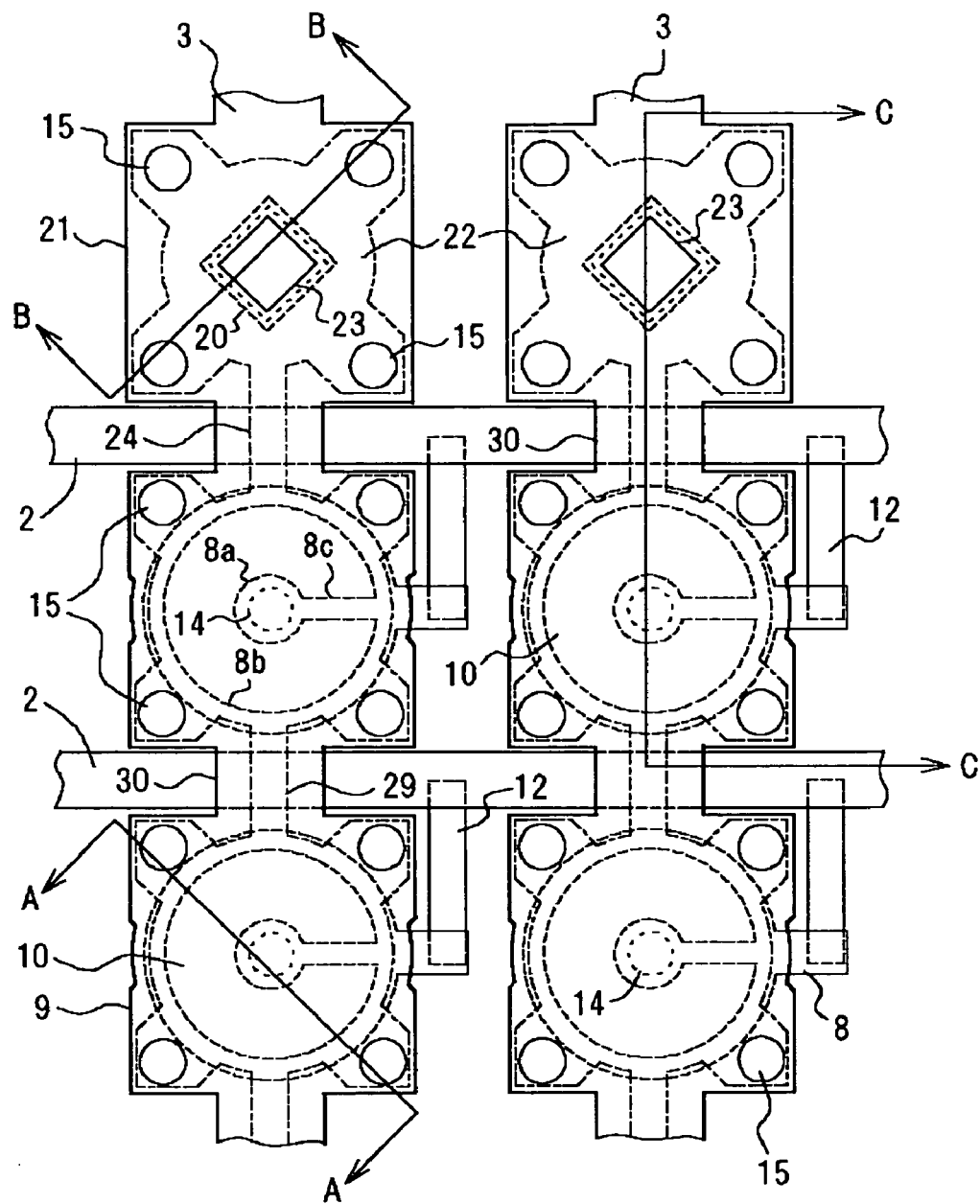
FIG. 2 is a plan view of sensor sections and a vent hole section of the pressure sensor.
Figure 3:
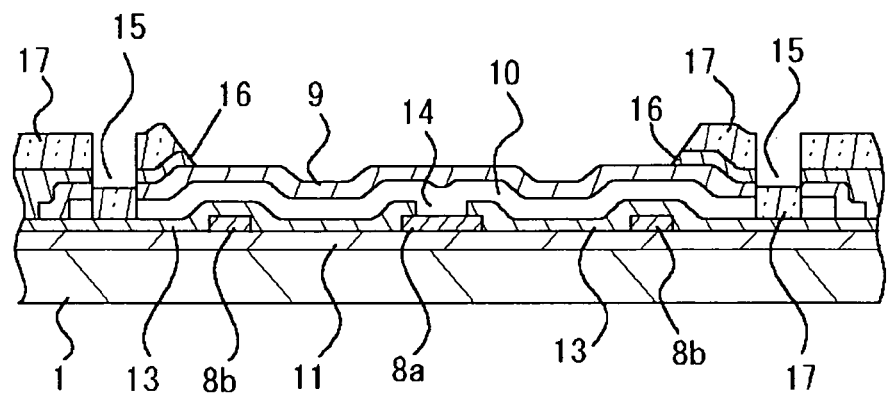
FIG. 3 is a schematic sectional view of the sensor section.
Figure 4:
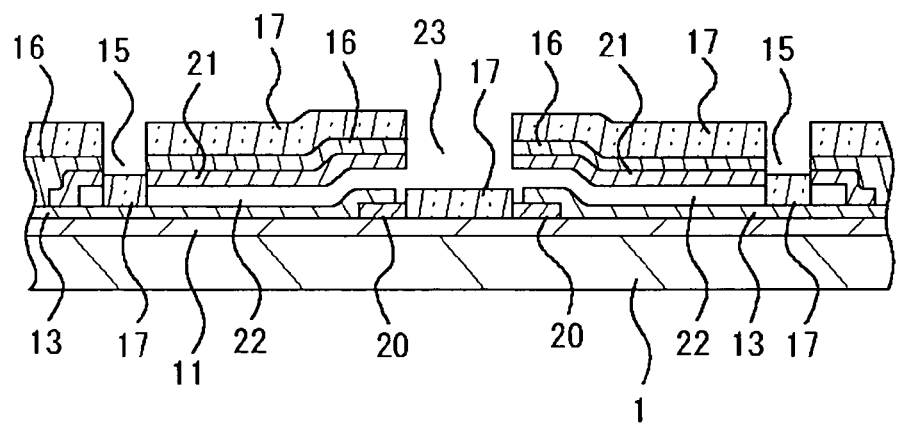
FIG. 4 is a schematic sectional view of the vent hole section.
Figure 5:
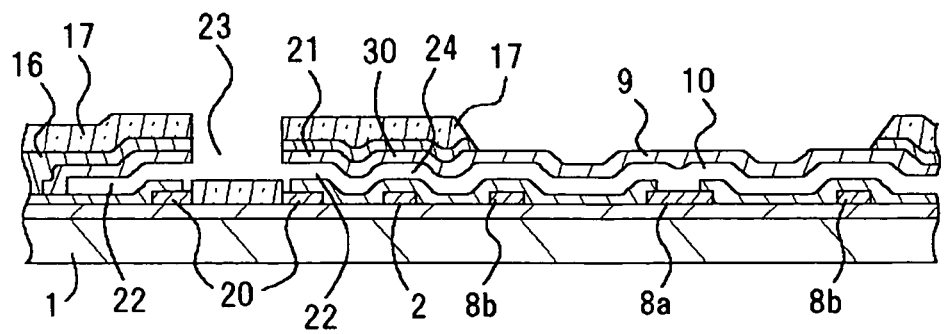
FIG. 5 is a schematic sectional view including the sensor section and the vent hole section.
Figure 6A:
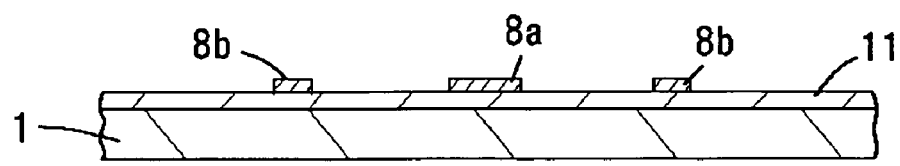
FIGS. 6(a) to 6(h) are sectional views for describing steps of a fabrication process for the sensor section.
Figure 6B:
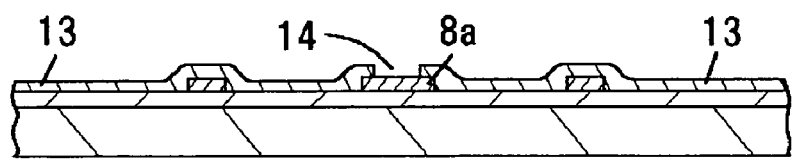
Figure 6C:
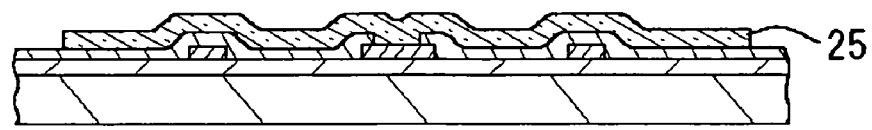
Figure 6D:
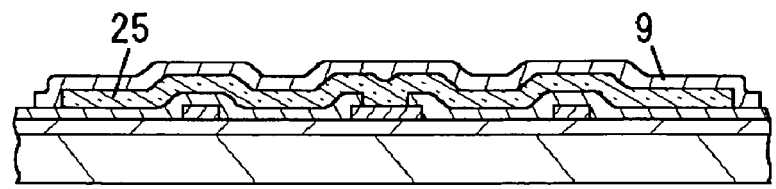
Figure 6E:
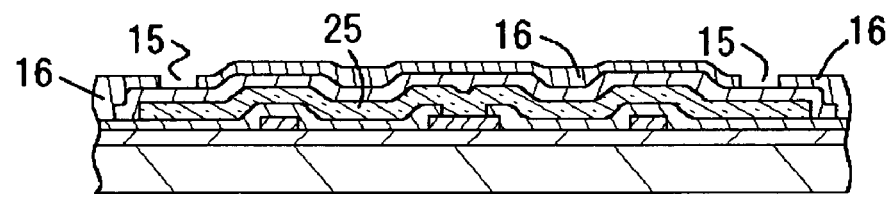
Figure 6F:
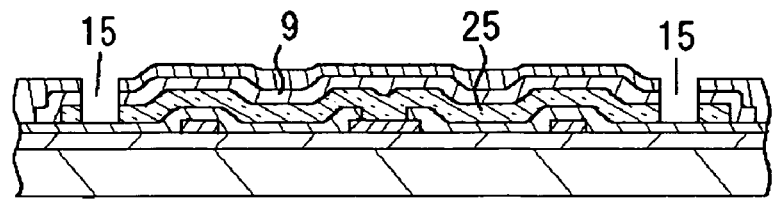
Figure 6G:
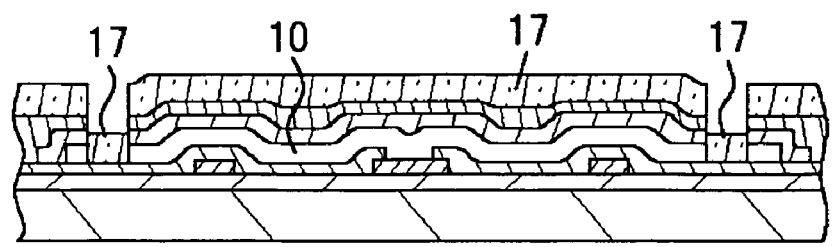
Figure 6H:
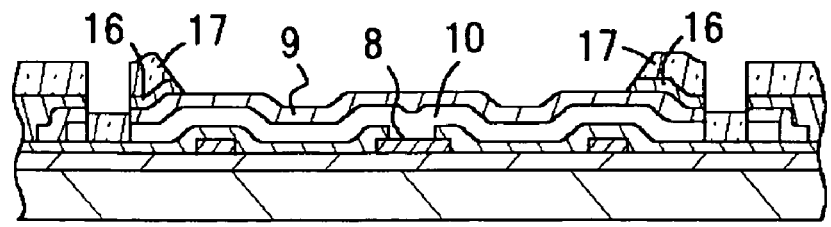
Figure 7A:
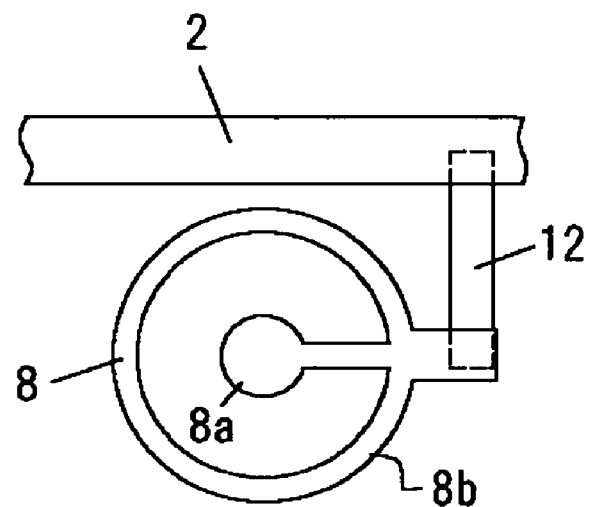
FIGS. 7(a) to 7(f) are plan views for describing steps of the fabrication process for the sensor section.
Figure 7B:
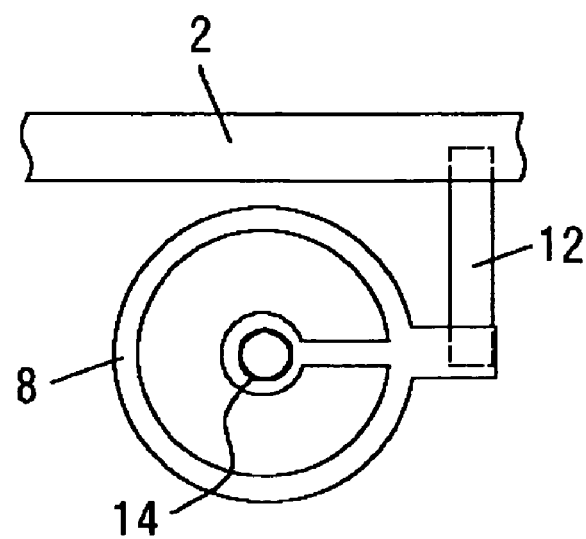
Figure 7C:
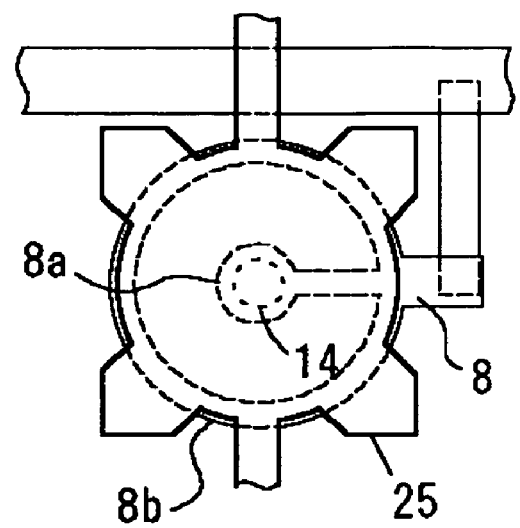
Figure 7D:
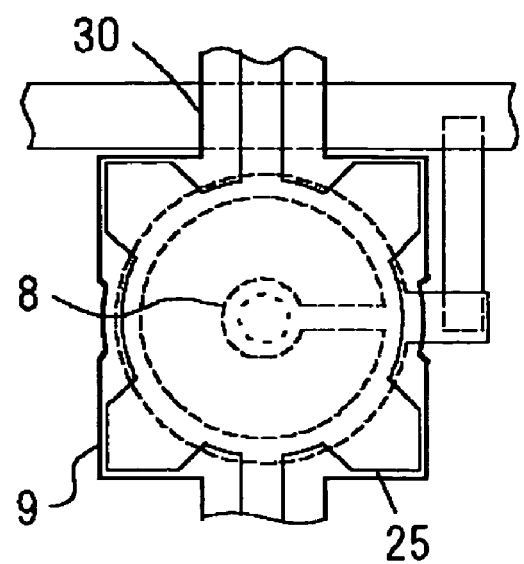
Figure 7E:
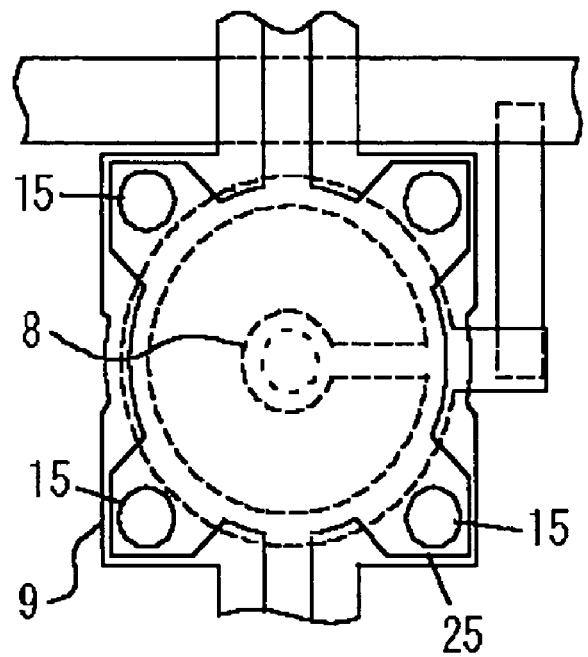
Figure 7F:
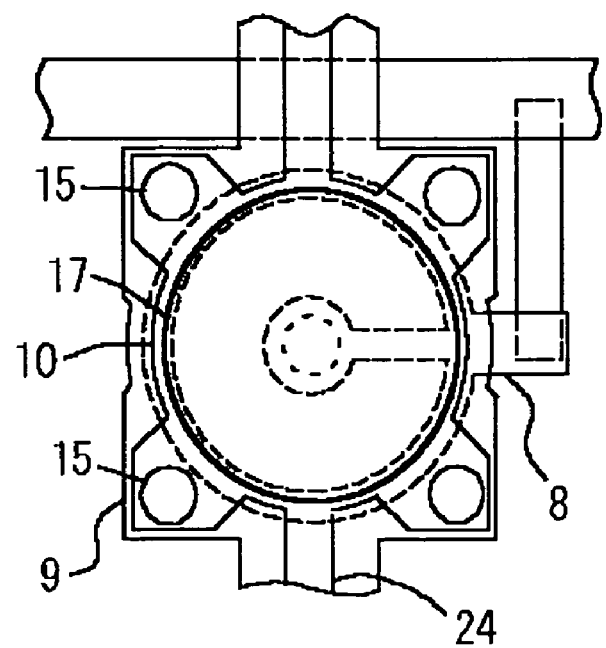

FIG. 2 is a plan view of the sensor sections 4 and the vent hole section 5 of the pressure sensor, FIG. 3 is a sectional view of the sensor section 4 taken along line A-A of FIG. 2, FIG. 4 is a sectional view of the vent hole section 5 taken along line B-B of FIG. 2 and FIG. 5 is a sectional view taken along line C-C of FIG. 2.

First of all, description will be given of a structure of a sensor section 4. A lower-layer insulating film 11 made of SiNx is stacked all over the surface of the glass substrate 1. Plural first wires 2 are disposed in parallel to each other on the lower-layer insulating film 11, and a first electrode 8 is formed in the sensor section 4. The first wire 2 and the first electrode 8 both are formed by patterning a metal layer stacked on the lower-layer insulating film 11. Used as a metal layer is, for example, a layer structure made of Al and Mo. The first electrode 8 includes: a circular portion 8a located in the central portion and corresponding to a central electrode portion of the sensor section 4; an annular portion 8b disposed in the periphery of the sensor section 4; and a radial connection portion 8c connecting the circular portion 8a and the annular portion 8b thereby. In this embodiment, one annular portion 8b is provided and the annular portion 8b is in the shape of an annularity having the center of the sensor section 4 as that thereof.

A numerical symbol 12 indicates a long, narrow contact layer for electrically connecting the first wire 2 and the first electrode 8, which is made of a polycrystalline layer or a metal layer. The contact layer 12 is made of a material higher in resistivity than metals of which the first wire 2 and the first electrode 8 are made. If herein, a resistance value of the contact layer is R, a voltage of a scanning signal supplied to the first wire 2 is E, and a current flowing through the second wire 3 is I by definition, a relation of E=IR is established. Therefore, a signal flowing into a second wire 3 through one sensor section 4 is of a current value of I. A signal flowing through the second wire 3, however, further flows in a sensor section 4, in a first wire 2 having not been scanned, in a sensor section 4 on another column and in a second wire 3 on another column, the scanning signal eventually passes through three contact layers 12 counted from the first wire 2 originally applied with the scanning signal. If a current flowing in the second wire 3 on another column is I' by definition, a relation of E=3RI' is established to thereby give a relation of I'=I/3. Therefore, by measuring current values in the second wires 3, it is determined whether or not a current has passed through other sensor sections 4, thereby enabling a precision of a sensor itself to be improved.

The contact layer 12 is preferably a film a thickness of which can be uniform and on which a pattern can be formed with optical means and, in this case, the contact layer 12 is made of polycrystalline silicon or amorphous silicon mixed with a conductive impurity, which may be replaced with a switching element or a rectifying element (a diode or the like). Resistance of the contact layer 12 is determined based on the minimum current value detectable in the sensing circuit 7. In a case where a highly resistant contact layer 12 is employed, wiring resistance is necessary to be reduced. Since a resistance value is proportional to a distance, the larger a distance from the scanning circuit 6, the higher a resistance value to as far as the scanning circuit 6. Hence, in a case where wire resistance from the scanning circuit 6 to a sensor section 4 located at a position farther from the scanning circuit 6 is on the same order as that of the contact layer 12, none of results of the detection in the sensing circuit 7 give proper information on which of the results is a proper value. Therefore, the first wire 2 preferably contains Al or the like low in resistivity.

A numerical symbol 13 indicates a first insulating film made of SiNx, $SiO_2$ or the like and covers the lower-layer insulating film 11 and the first wires 2. The first insulating film 13 also exists in the sensor section 4 and a sensor hole 14 in the shape of a circle is formed in the vicinity of the center of the sensor section 4 to expose the central portion of a circular portion 8*a* of the first electrode 8. A size and thickness of the sensor hole 14 (a thickness of the first insulating film 13 at the periphery of the sensor hole 14) affect a sensitivity of the sensor.

Since the first insulating film 13 covers the periphery of the circular portion 8*a* of the first electrode 8, the second electrode 9 is not brought into close contact with the first electrode 8 at a large area and, after the second electrode 9 is brought into contact with the first electrode 8, the second electrode 9 starts being separated from the first electrode 9 from a point in the vicinity of the first insulating film 13. The thicker the first insulating film 13, the second electrode 9 restores the original state with more of ease even if elasticity of the second electrode 9 is weaker, with a lower possibility that the second electrode 9 is brought into contact with the first electrode 8.

In a case where the sensor hole 14 is larger, an exposed portion of the first electrode 8 increases, which results in a higher possibility of the first electrode 8 being brought into contact with the second electrode 9. Therefore, detection of a lower pressure imposed onto the sensor section 4 can be realized, whereas overdetection is easier to occur by increase in sensitivity to detect a low pressure. Contrary thereto, in a case where the sensor hole 14 is smaller, an exposed portion of the first electrode 8 decreases, which results in a lower possibility of the first electrode 8 being brought into contact with the second electrode 9; therefore, the sensor is more insensitive to a pressure by decrease in possibility of the contact. Therefore, a thickness of the first insulating film and a size of the sensor hole are appropriately determined in consideration of a required sensitivity of a pressure sensor.

The first electrode 8 exposed from the first insulating film 13 is disposed opposite to the second electrode 9 with the cavity 10 interposed therebetween. The cavity 10, of which a forming method will be described later, extends to as far as the annular portion 8*b* of the first electrode 8 in the horizontal direction of the sensor section 4. Release holes 15 are provided at four corners of the sensor section 4 and the cavity 10 extends to the release holes 15.

The second electrode 9 is formed with a metal layer and, for example, Mo is used as a metal of the layer. In the sensor section 4, the second electrode 9 is patterned into a square of 50 μm×50 μm in size and the release holes 15 are opened at the four corners. In the sensor sections 4 disposed in the column direction, a connection portion 30 is formed that electrically connects between the second electrodes 9 of sensor sections 4 adjacent to each other or between the bent hole and the sensor section, and the second electrodes 9 and connection portions 30 play a second role as the second wire 3. The connection portion 30 is narrower in width than the second electrode 9, and is overlapped with the first wire 2 through the first insulating film 13 in an orthogonal direction. Description will be given of a fabrication process for the second electrodes 9 and the connection portions 30 later, which are formed by patterning the same metal layer.

The second electrode 9 has an almost uniform film thickness with a profile of depression and protrusion combined since a surface of an intermediate layer 25 described later assumes a profile of depression and protrusion combined in conformity with a shape of the first electrode 8. That is, macroscopically, the portions located opposite to the circular portion 8*a* and annular portion 8*b* are protruded and the other portions are depressed. In such a way, since the second electrode 9 has globally a surface profile of depression and protrusion combined, the second electrode 9 is reinforced to thereby increase its restoring force. Even if a strong pressure acts on the second electrode 9, a stress is distributed in the whole of the second electrode 9 so as to raise its strength to thereby reduce a possibility of the second electrode 9 being broken with an improved durability.

A numerical symbol 16 indicates a second insulating film and a numerical symbol 17 indicates a protective film, which films are stacked on the first insulating film 13 and the second wire 2. In this embodiment, both films are made of SiNx. Note that a material of the films 16 and 17 are not specifically limited to SiNx, and may be $SiO_2$ or an organic insulating material such as polyimide, polyacrylate or the like. Though details will be given later, the second insulating film 16 and the protective film 17 are formed individually in respective separate steps. The release holes 15 in the shape of a circle are formed in the second insulating film 16 and the protective film 17 is formed on the second insulating film 16 after formation of the release holes 15; therefore the release holes 15 are closed with the protective film 17. The protective film 17 closing the release holes 15 and the protective film 17 stacked on the second insulating film 16 are simultaneously formed, but both are not continuous and separated. The protective film 17 closing the release hole 15 corresponds to a closed portion.

In the sensor section 4, the second insulating film 16 and the protective film 17 on the second electrode 9 are removed so as to form an empty circle surrounded with both films to thereby expose the second electrode 9. Since the second electrode 9 is curved at the boundary between the exposed portion and the surrounding second insulating film 16 as a supporting point, a flexibility of the second electrode 9 changes according to the magnitude of an area where the second insulating film 16 is removed. If the second insulating film 16 is removed in a larger area, the second electrode 9 is easier to be curved and when a protrusion of a specimen is brought into contact with the second electrode 9, the second electrode 9 is curved to contact the first electrode 8; therefore, the sensor section 4 is more sensitive to a pressure. Contrary thereto, if the second insulating film 16 and the protective film 17 on the second electrode 9 are removed in a smaller area, the second electrode 9 is harder to be curved correspondingly; therefore, the sensor section 4 is less sensitive to a pressure. Easiness in curving of the second electrode 9 affects a sensitivity of the sensor section 4, and the more sensitive the sensor section 4 is to a pressure, a pattern of the specimen is detected more indefinite due to overdetection of the pressure, while on the other hand, the less sensitive the sensor section 4 is to a pressure, there arises a portion of the specimen where a fine pattern thereof cannot be detected and a pattern of the specimen is detected with less of sharpness. Therefore, excessive sensitivity or excessive insensitivity contributes to increase in possibility of erroneous detection, which necessitates a design in which easiness in curving of the second electrode 9 is properly set. If the boundary between a removed area of the second insulating film 16 and the rest of the film is set so as to be located inside the annular portion 8*b* on the outermost side of the first electrode 8, a flexibility and restoring force of the second electrode 9 fall within proper ranges.

Further, the second insulating film 16 and the protective film 17 in the form of a thin film present on the second electrode 9 play roles of reinforcement and protection, which reduces breakage of the second electrode 9 to some extent corresponding to the reinforcement and protection. While in this embodiment, the second insulating film 16 and the protective film 17 are removed partly in an area to the full depth thereof, the second insulating film 16 and the protective film 17 may be removed partly in an area part way deeply in the thickness so that a central portion is thinner than the rest. In the latter case, the thinner portion is preferably in the shape of a circle with the center of the sensor section 4 as the center thereof. Note that while in this embodiment, the second insulating film 16 is removed in a circle, the film may be removed in a polygonal shape.

Then, description will be given of the vent hole section 5. A numerical symbol 20 indicates a dummy electrode positioned in the vicinity of the center of the vent hole section 5 and formed on the lower-layer insulating film 11. The dummy electrode 20 is a metal layer in the shape of a tetragon having an opening in the center thereof and formed in the same step as the first wire 2 and the first electrode 8. Therefore, for example, a metal layer of a layer structure made of Mo and Al is stacked all over the surface of the lower-layer insulating film 11, and the metal layer is patterned to form the dummy electrode 20, the first wire 2 and the first electrode 8 simultaneously. The dummy electrode 20 is not electrically connected to the first wire 2 and formed isolatedly. The first insulating film 13 is stacked so as to cover the lower-layer insulating film 11 and the dummy electrode 20, and is removed in the vicinity of the center of the vent hole section 5 to expose parts of the lower layer insulating film 11 and the dummy electrode 20.

A numerical symbol 21 indicates an auxiliary electrode located in the vent hole section 5, and the auxiliary electrode 21 is a metal layer made of Mo and the like similar to the second electrode 9 of the sensor section 4 and patterned into a square of 50 μm×50 μm in size, and the release holes 15 in the shape of a circle are formed in the metal layer at four corners thereof. The auxiliary electrode 21 of the vent hole section 5 is analogous to the second electrode 9 of the sensor section 4 in the shape, while having no function to detect a pattern and exists as part of the second wire 3. A second cavity 22 is provided between the auxiliary electrode 21 and the first insulating film 13 and spatially communicates with the cavity 10 of the sensor section 4 to make both cavities 10 and 22 to be ventilatable therebetween. The second insulating film 16 is stacked on the auxiliary electrode 21 and the release holes 15 are provided therein in a similar manner to that in the auxiliary electrode 21.

Figure 10A:
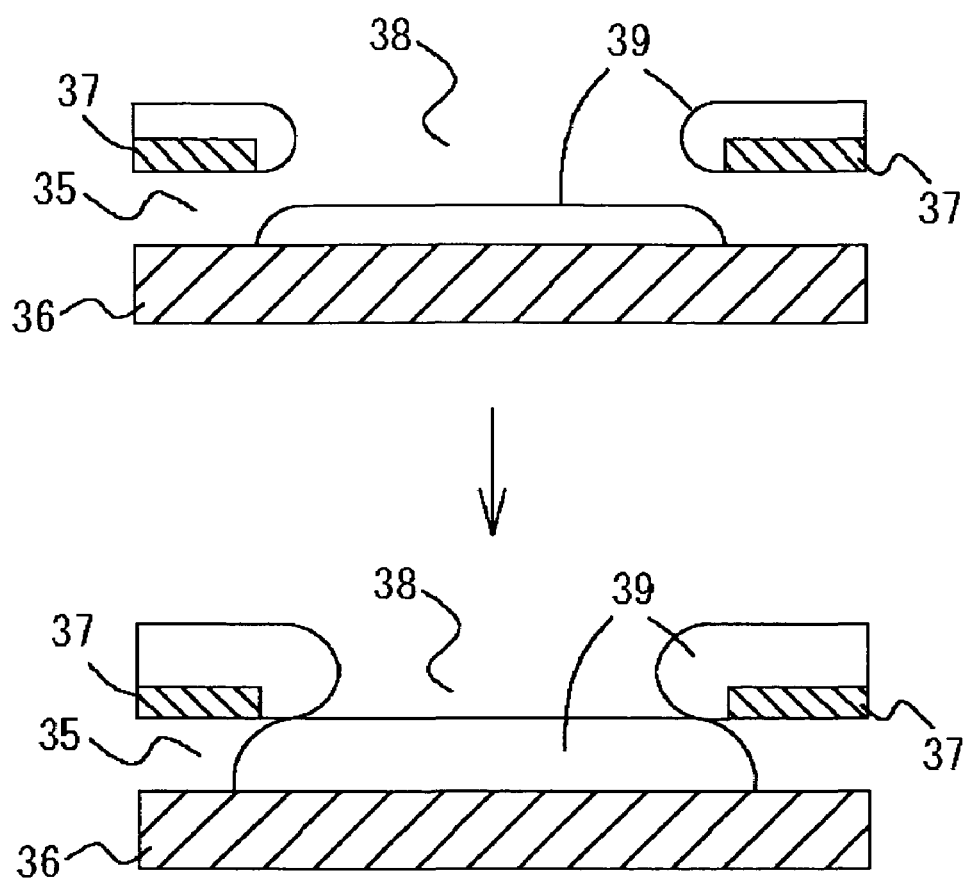
FIGS. 10(a) and 10(b) are schematic views for describing a way that an opening is closed.
Figure 10B:
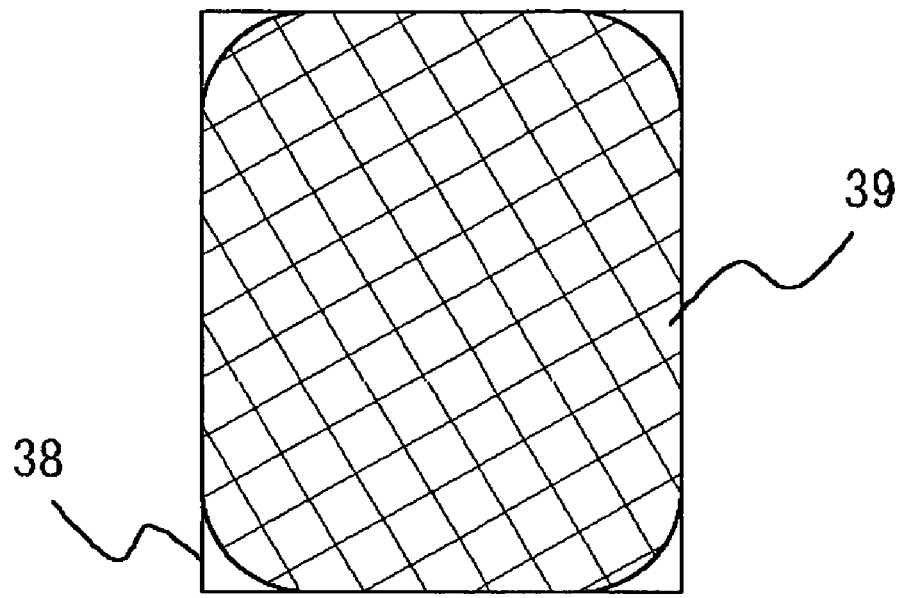

Formed in the center of the vent hole section 5 is a tetragonal vent hole 23 penetrating through the auxiliary electrode 21, which is the upper surface of the second cavity 22, and the second insulating film 16. In this embodiment, the vent hole 23 is tetragonal but has only to be polygonal. The dummy electrode 20 and the first insulating film 13 do not exist at a position corresponding the vent hole 23. The release holes 15, when the protective film 17 is stacked on the second insulating film 16, are closed with part of the protective film 17 to disconnect a communication state with the second cavity 22, while the vent hole 23 maintains a communication state with the second cavity 22 since the protective film 17 is stacked on the lower-layer insulating film 11 therein. In this case, the release holes 15 is easier to be closed because of being circle, while the vent hole is harder to be closed because of being polygonal. Description will be given of the phenomena based on FIGS. 10(*a*) and 10(*b*). FIGS. 10(*a*) and 10(*b*) are schematic views for describing a way that an opening is closed. FIG. 10(*a*) is a sectional view and FIG. 10(*b*) is a plan view. In the figures, a numerical symbol 36 indicates the bottom surface layer of a cavity 35, a numerical symbol 37 indicates the upper surface layer of the cavity 35, a numerical symbol 38 indicates an opening formed in the upper surface layer 37, and a numerical symbol 39 indicates a sealing layer stacked in order to close the opening 38. The sealing layer 39 is formed as a film by means of plasma CVD. When a film is formed at a site where a level difference exists, such as the opening 38, a film is formed at an edge of the opening 38 (an end of the upper surface layer 37) and on the bottom surface layer 36 in the opening 38 as shown in FIG. 10(*a*). When the sealing layer 39 stacked on the bottom layer 36 reaches as far as the opening 38, a pin hole is formed at an angled portion of the polygon as shown in FIG. 10(*b*). A shape of a release hole 15 may be any of a polygon, a circle and a shape having a curved portion in part as far as the structure thereof enables removal of the intermediate layer 25. Among these, a shape of a release hole 15 is preferably a circle having no angular portion in order to close the opening with certainty. In contrast thereto, since the vent hole 23 is required to be open even when the release holes 15 are surely closed, a shape thereof is suitably a polygon having angular portions at the periphery.

The second insulating film 16 and the protective film 17 on the auxiliary electrode 21 are not removed in the vent hole section 5 and remain as they are. Therefore, curving of the auxiliary electrode 21 are restricted by the second insulating film 16 and the protective film 17 and the peripheral area of the vent hole 23 is reinforced to secure that the vent hole 23 communicates with the second cavity 22 even in fabrication or in operation.

A numerical symbol 24 indicates a communication path and in the interior of the communication path, which is hollow, air can be ventilated and located between the vent hole portion 5 and a sensor section 4 to cause the cavity 10 of the sensor section 4 and the second cavity 22 of the vent hole section 5 to communicate with each other. The communication path 24 is constructed with the bottom surface of the first insulating film 13 and the side and upper surfaces of the connection portion 30, which is a metal layer, as the second wire 3 and which serves as a connection portion 30. The cavity 10 of the sensor section 4 and the second cavity 22 of the vent hole section 5 are caused to be spatially in a communication state with each other by the communication path 24, and the outside air can be ventilated therebetween through the vent hole 23. Since a width of the communication path 24 is narrower than the cavity 10, dust intruding through the vent hole 23 can be prevented from further intruding into the cavity 10 through the communication path 24. A numerical symbol 29 indicates a communication portion located between adjacent sensor sections 4, and causing the cavities 10 of the sensor sections 4 to spatially communicate with each other. A construction of the communication portion 29 is the same as the communication path 24; therefore, description thereof will not be repeated herein.

With such a construction adopted, even after the release holes 15 are closed with the protective film 17, an air pressure in the cavities 10 of the sensor sections 4 can be kept so as to be almost the same as the outside air pressure. By connecting spatially between adjacent sensor sections, air pressures in the sensor sections are uniform; therefore, a large load is not imposed on the second electrode 9 of a sensor section 4 in a step of creating a vacuum; thereby preventing the second electrode 9 to be broken. Furthermore, since the vent hole section 5 is provided separately from the sensor sections 4, dust is prevented from intruding into the cavities 10 of the sensor sections 4, thereby enabling a pressure sensor fewer in failures to be obtained.

Then, description will be given of a fabrication process for the sensor sections 4 and the vent hole section 5 based on accompanying drawings. FIGS. 6(*a*) to 6(*h*) are sectional views (corresponding to the sectional view of FIG. 3) for describing steps of a fabrication process for the sensor section 4, FIGS. 7(*a*) to 7(*f*) are plan views for describing steps of the fabrication process for the sensor section 4, FIGS. 8(*a*) to 8(*h*) are sectional views (corresponding to the sectional view of FIG. 4) for describing steps of a fabrication process for the vent hole section 5, and FIGS. 9(*a*) to 9(*d*) are plan views for describing steps of the fabrication process for the vent hole section 5.

The lower-layer insulating film 11 made of SiNx is stacked on the glass substrate 1 and an Si layer is stacked on the lower-layer insulating film 11. The Si layer is subjected to annealing treatment to be polycrystallized and, thereafter, the Si layer in a portion corresponding to the contact layer 12 is left behind by means of a photolithographic method. Then, a metal layer of a layer structure made of Mo and Al is formed on the lower-layer insulating film 11 by means of a sputtering method or the like to form the second wire 2, the first electrode 8 and the dummy electrode 20 as shown in FIGS. 6(*a*), 7(*a*) and 8(*a*) in the metal layer by means of a photolithographic method. On this occasion, the dummy electrode 20 is formed in the shape of a tetragon having no opening at the center thereof.

Then, SiNx is stacked on the lower-layer insulating film 11 and the first wire 2 to form the first insulating film 13. The first insulating film 13 is removed in portions corresponding to the circular portion 8*a* and the dummy electrode 20 in an etching step. In the sensor section 4, as shown in FIGS. 6(*b*) and 7(*b*), the first insulating film 13 on the circular portion 8*a* is removed in a circle to form the sensor hole 14. In such a way, the central portion of the circular portion 8*a* is exposed and the peripheral portion of the circular portion 8*a* is covered with the first insulating film 13. In the vent hole section 5, as shown in FIGS. 8(*b*) and 9(*a*), the first insulating film 13 on the dummy electrode 20 is removed in a tetragon. In this situation, the central portion of the dummy electrode 20 is exposed and the peripheral portion of the dummy electrode 20 is covered with the first insulating film 13. The etched portion of the first insulating film 13 on the dummy electrode 20 is larger in area than the vent hole portion 23. A proportion of the first insulating film 13 present on the circular portion 8*a* affects a sensitivity of the pressure sensor and a proportion of the first insulating film 13 present on the dummy electrode 20 affects a size of the vent hole 23.

Then, a metal layer made of Al is stacked on the first insulating film 13, the exposed first electrode 8 and the exposed dummy electrode 20. Thereafter, the metal layer is patterned in a predetermined shape to form the intermediate layer 25 by means of a photolithographic method or the like. Spaces occupied by the intermediate layer 25, which is finally removed, serve as the cavity 10, the communication path 24 and the communication portion 29. Therefore, in the sensor section 4, there is formed the intermediate layer 25 in a shape shown in FIGS. 6(*c*) and 7(*c*) and in the vent hole section 5, there is formed the intermediate layer 25 in a shape shown in FIGS. 8(*c*) and 9(*b*). The intermediate layer 25 in the sensor section 4 includes: an almost circular portion covering from the circular portion 8*a* to the annular portion 8*b* as the first electrode 8; and projected portions extending to as far as four release holes 15. The intermediate layer 25 of the vent hole section 5 is in almost the same shape as in the sensor section 4. Since the dummy electrode 20 of the vent hole section 5 exists only in the vicinity of the center thereof, no metal layer such as the annular portion 8*b* of the first electrode 8 exists in the vent hole section 5, while the intermediate layer 25 includes a circular portion covering a great part of the vent hole section 5 including the dummy electrode 20, and the projected portions extending to as far as the release holes 15. Furthermore, a narrow, long intermediate layer 25 corresponding to the communication path 24 exists between the sensor section 4 and the vent hole section 5, and a narrow, long intermediate layer 25 corresponding to the communication portion 29 exists between adjacent sensor sections 4. Therefore, the intermediate layer 25 is formed continuously without disconnection in the sensor sections 4 and the vent hole section 5 disposed in one column direction. Note that shapes and sizes such as thickness values of portions of the intermediate layer 25 are designed desirably so as to match shapes and sizes of the cavities 10, the communication paths 24 and the communication portions 29.

Then, a metal layer is stacked on the intermediate layer 25 and the first insulating layer 13 by means of a sputtering method. The metal layer is formed in a layer structure made of Mo and Al. The intermediate layer 25 in the sensor section 4 has a surface profile of depression and protrusion combined in conformity with a shape of the first electrode 8. A resist is coated on the metal layer and then applied with exposure, development and etching treatment by means of a photolithographic method to form the second wire 3 including the second electrodes 9 and the connection portions 30. In this step, the intermediate layer 25 is perfectly covered with the metal layer as the second wire 3. As shown in FIGS. 6(*d*) and 7(*d*), in the sensor section 4, the second electrode 9 in the shape of an almost tetragon perfectly covering the intermediate layer 25 is formed at an almost uniform thickness and the second electrode 9 assume a surface profile of depression and protrusion combined in conformity with a surface profile of depression and protrusion combined of the intermediate layer 25. In this step, the release holes 15 are still not formed in the second electrode 9. As shown in FIGS. 8(*d*) and 9(*c*), formed in the vent hole section 5 is the auxiliary electrode 21 in the shape of almost a tetragon perfectly covering the intermediate layer 25, and in this step, neither the release holes 15 nor the vent hole 23 is formed in the auxiliary electrode 21. The intermediate layer 25 corresponding to the communication paths 24 and the communication portions 29 are covered by the connection portions 30, and the second electrodes 9 of adjacent sensor sections 4 are connected electrically by the connection portion 30.

Then, SiNx is stacked on the second electrode 9 and the first insulating film 13 to form the second insulating film 16. In the sensor section 4, as shown in FIGS. 6(*e*) and 7(*e*), SiNx in portions corresponding to the release holes 15 are removed and in the vent hole section 5, as shown in FIG. 8(*e*), SiNx in portions corresponding to the release holes 15 and the vent hole 23 are removed The portions from which the second insulating film 16 is removed exposes parts of the second electrodes 9 and the auxiliary electrodes 21.

Then, etching treatment is applied to remove both materials of Mo and Al. A metal layer in an exposed portion without coverage of the second insulating film 16 is removed by this etching treatment. As etching methods, there can be used both of dry etching and wet etching. Mo and Al can both be etched off by using, for example, a mixture of phosphoric acid, nitric acid and acetic acid as an etching solution. With this etching treatment applied, removed in the sensor section 4 are, as shown in FIG. 6(*f*), the second electrode 9 and the intermediate layer 25 in a portion corresponding to the release holes 15. Removed in the vent hole section 5 are, as shown in FIG. 8(*f*), the auxiliary electrode 21 and the intermediate layer 25 in a portion corresponding to the release section 15, and the auxiliary electrode 21, the intermediate layer 25 and the dummy electrode 20 in a portion corresponding to the vent hole 23.

Then, etching treatment is applied to remove only the intermediate layer 25. In this step, a wet etching solution is adopted, and a mixture of hydrochloric acid, phosphoric acid and water is used as an etching solution. The etching solution reaches the intermediate layer 25 through the release hole 15 to etch off the intermediate layer 25 from the end thereof sequentially into the interior. In a case of use of an etching solution of a mixture of hydrochloric acid:phosphoric acid:water=1:5:1 in mixing ratio, a galvanic effect occurs between Al in the intermediate layer 25 and Mo of which the second wire 3 is made to thereby etch off Al in a short time. In a case where Al is aggressively etched off with the galvanic effect, an etching solution especially containing phosphoric acid in volume five or more times that of hydrochloric acid exerts the effect, whereas in a case of use of an etching solution of a mixture of hydrochloric acid:phosphoric acid=1:5 in mixing ratio, a lot of gas bubbles are generated simultaneously during etching. To cope with such generation of gas bubbles, studies have been conducted with experiments with the results that in a case of use of an etching solution of a mixture of hydrochloric acid:phosphoric acid:water=1:10:1, Al can be aggressively etched off in a short time with fewer gas bubbles generated. With this etching treatment adopted, the intermediate layer 25 can be surely removed to form the respective cavities 10, 22, the communication path 24 and the communication portions 29 (FIGS. 8(*g*) and 9(*d*)).

Thereafter, SiNx is stacked on the second insulating film 16 to form the protective film 17. SiNx is formed by means of, for example, CVD and is stacked all over the surface of the glass substrate 1 at almost the same thickness. In this step, since the second insulating film 16 or the like does not exist in the release hole 15 and the vent hole 23, the protective film 17 is stacked on the first insulating film 13 in the release hole 15 and on the lower-layer insulating film 11 in the vent hole 23. The protective film 17 is set to a thickness on the order of a value at which the protective film 17 closes the release hole 15 in the sensor hole 4, but simultaneously does not close the vent hole 23 in the vent hole section 5.

Figure 11:
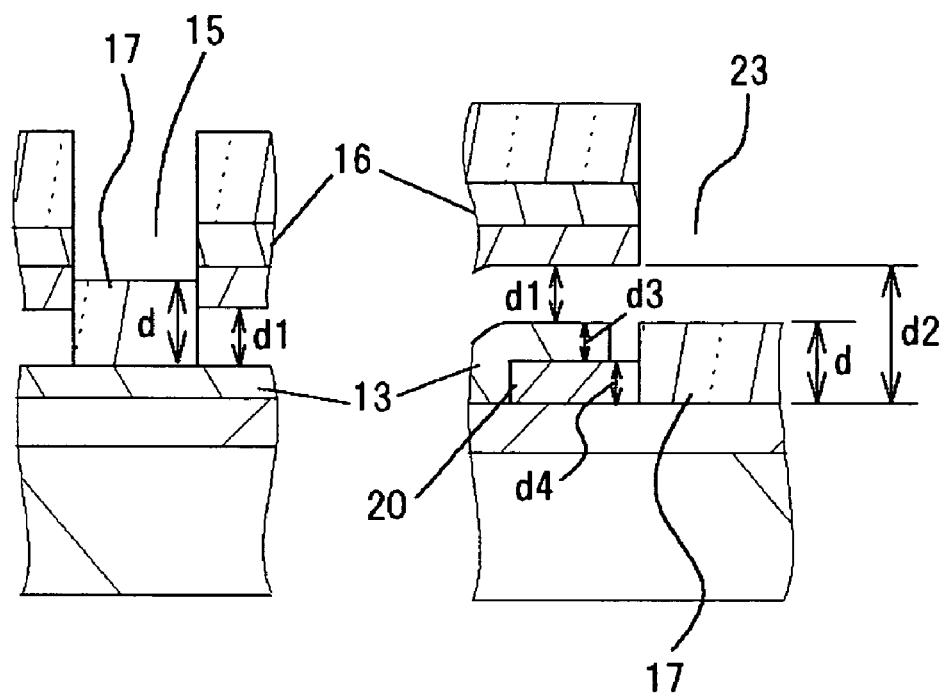
FIG. 11 is enlarged sectional views of portions in the vicinities of a release hole and a vent hole.

FIG. 11 is enlarged sectional views of portions in the vicinities of a release hole 15 and a vent hole 23, and description will be given of a condition imposed on a thickness of the protective film 17 based on FIG. 10. Since the cavity 10 is formed using the intermediate layer 25, a thickness of the intermediate layer 25 is that of the cavity 10 and the cavity 10 is at an almost uniform thickness therein. A thickness of the cavity 10 corresponds to a distance of the bottom surface of the lower space of the release hole 15 to the release hole 15. Therefore, if a thickness of the cavity 10 is d1 and a thickness of the protective film 17 (a closed portion) closing the release hole 15 is d by definition, the release hole 15 can be closed with certainty if a relation of d1≦d is established. In contrast thereto, since the first insulating film 13 and the dummy electrode 20 are present in the peripheral area of the vent hole 23, but are removed in the vent hole 23, the bottom surface of the vent hole 23 is lower than the bottom surface of the release hole 15. Therefore, if a distance from the bottom surface of the lower space of the vent hole 23 to the vent hole 23 is d2, a thickness of the first insulating film 13 is d3, a thickness of the dummy electrode 20 is d4 by definition, a relation of d2=d1+d3+d4 is established, and the vent hole 23 is not closed even in a state where the protective film 17 is stacked if a relation d<d2 is established. By stacking the protective film 17 satisfying this condition, the release hole 15 is, as shown in FIG. 6(*g*), closed in the sensor section 4 and dust can be prevented from intruding into the cavity 10 through the release hole 15. In the vent hole section 5, since the vent holes 23, as shown in FIG. 8(*h*), communicates with the second cavity 22, pressures in the cavities 10 of the sensor sections 4 can be almost the same as in the outside air.

Thereafter, as shown in FIGS. 6(*h*) and 7(*f*), removed are the second insulating film 16 and the protective film 17 on the second electrode 9 in the sensor section 4. The second insulating film 16 and the protective film 17 are removed in a region covering the circular portion 8*a* to the annular portion 8*b* of the first electrode 8 and, thereby, the second electrode 9 in the region is easier to be curved. With such a construction adopted, the sensor section 4 sensitive to a pressure can be formed.

Even if in such a way, the cavity 10 is formed in the sensor section 4 and the release holes 15 used for forming the cavity 10 are closed, the cavity 10 is maintained in a state where it can communicate with the outside air. Therefore, even if the sensor section 4 is placed in a space in which a vacuum has been created in a later step of a fabrication process, it is prevented from occurring a large difference between air pressures in and outside the cavity 10, with the result of no great load on the second electrode 9. Therefore, the sensor section 4 is prevented from being broken to increase a product yield. Note that the vent hole of the vent hole section may be closed after completion of a step in which the sensor section is necessary to be placed in a space in which a vacuum has been created. In the closing, for example, a procedure is adopted in which a sealing material is coated on the vent hole and the coat of the sealing material is cured in a heat treatment or by illumination with ultraviolet.

In this embodiment, a shape of the first electrode 8 in the sensor section 4 is not specifically limited to a shape of combination of the circular portion 8*a* and the annular portion 8*b* as adopted therein. Therefore, for example, a structure thereof may be such that only a disk-like electrode occupying a great part of the sensor section is provided or, alternatively, a small circular portion is disposed in the center of the sensor section and plural annular portions are disposed around the circular portion concentrically therewith. Another structure thereof may be such that the electrode portion working as a sensor in the first electrode has only to be connected to the first wire and the annular portions are provided independently of the circular portion.

Figure 12:
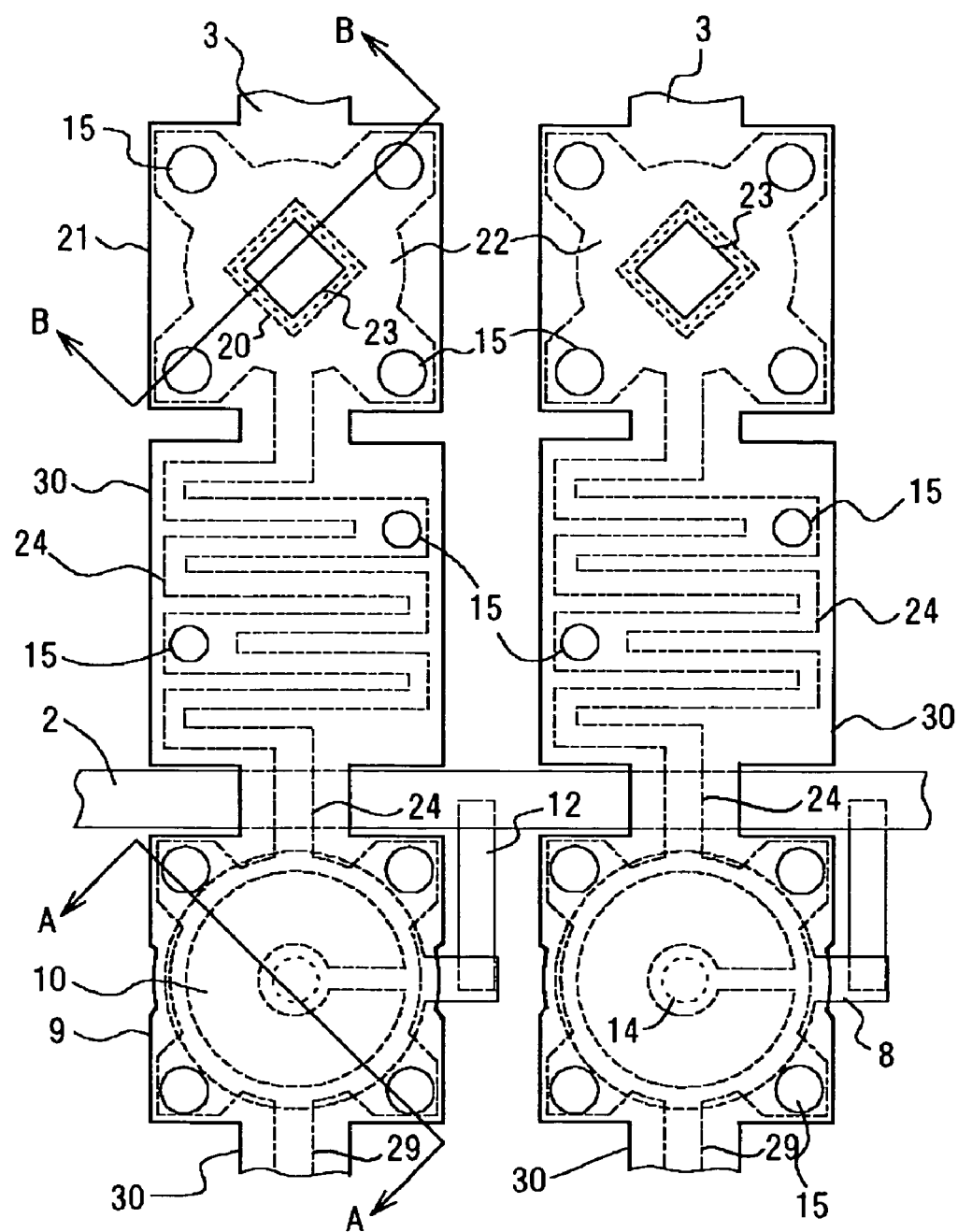
FIG. 12 is a plan view of a sensor section and a vent hole section of a pressure sensor according to a second embodiment of the present invention.

Then, description will be given of a second embodiment of the present invention with reference to the accompanying drawings. In the embodiment, a shape of the communication path 24 is different from that of the first embodiment while the other parts of the construction are the same; therefore, description thereof will not be repeated herein. FIG. 12 is a plan view of the sensor section 4 and the vent hole section 5.

In this embodiment, the communication portion 29 located between adjacent sensor sections 4 is of a straight line connecting both cavities 10 at the shortest distance, whereas the communication path 24 between the vent hole section 5 and a sensor section 4 is formed in a zigzag fashion. The communication path 24 between the vent hole section 5 and the sensor section 4 is longer than the communication portion 29 between adjacent sensor sections 4. Since the upper surface of the communication path 24 is formed by the connection portion 30, the connection portion 30 between the vent hole section 5 and the sensor section 4 is of almost the same size of the second electrode 9 of the sensor section 4.

Figure 8A:
FIGS. 8(a) to 8(h) are sectional views for describing steps of a fabrication process for the vent hole section.
Figure 8B:
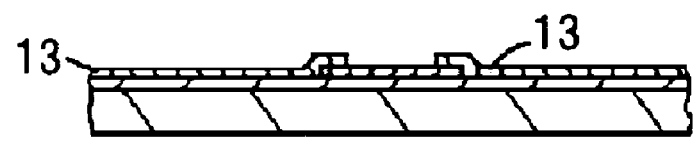
Figure 8C:
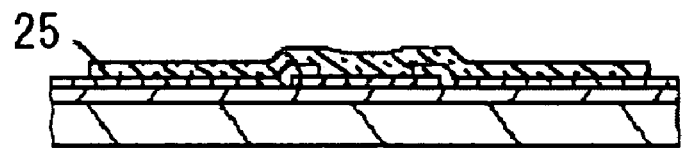
Figure 8D:
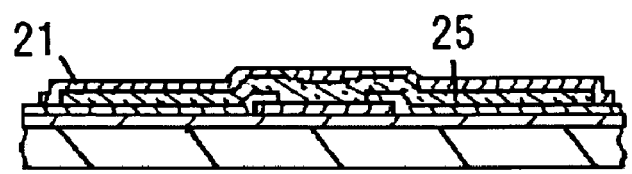
Figure 8E:
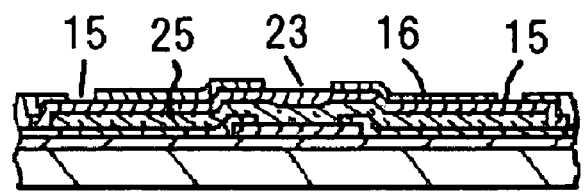
Figure 8F:
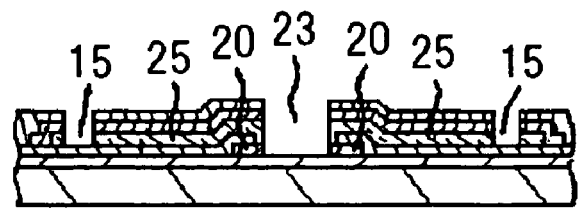
Figure 8G:
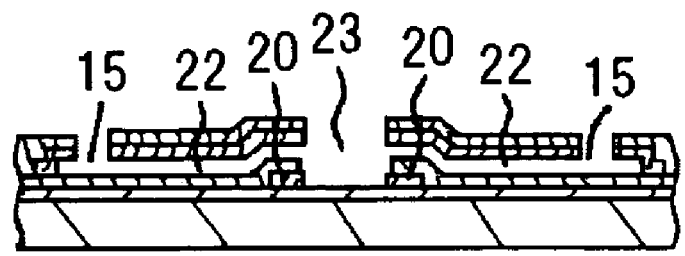
Figure 8H:
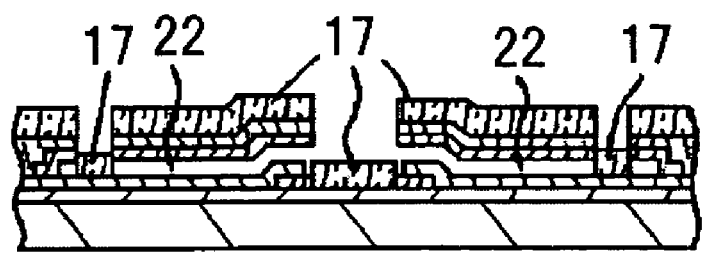
Figure 9A:
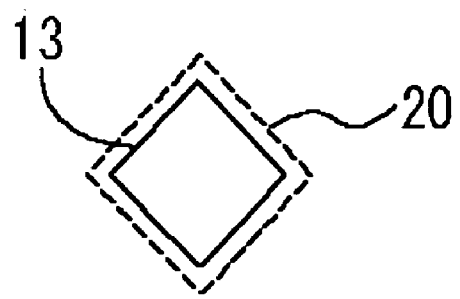
FIGS. 9(a) to 9(d) are plan views for describing steps of the fabrication process for the vent hole section.
Figure 9B:
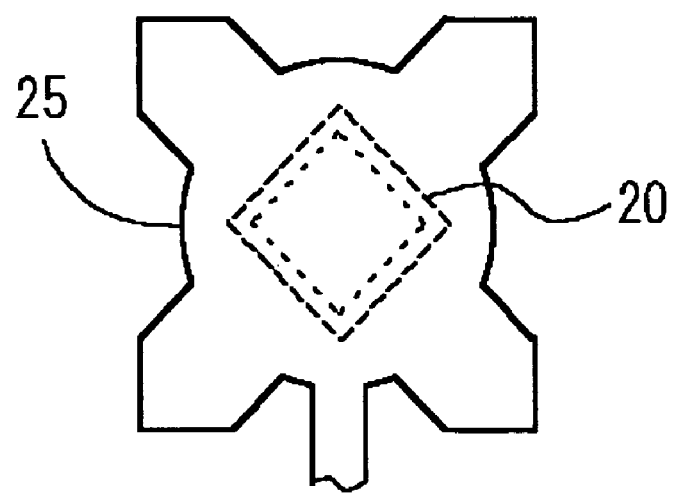
Figure 9C:
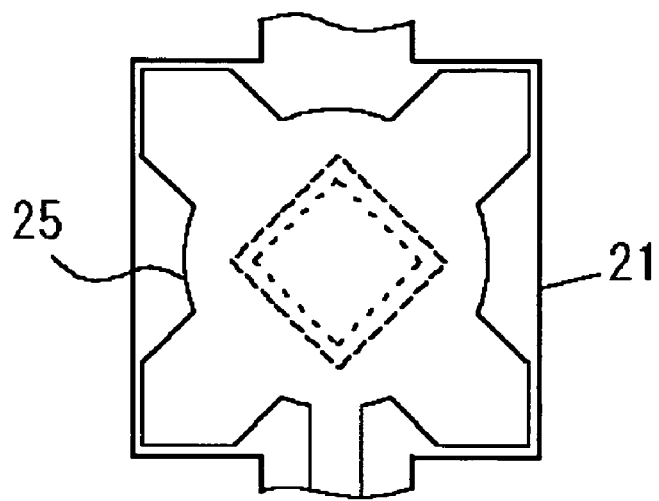
Figure 9D:
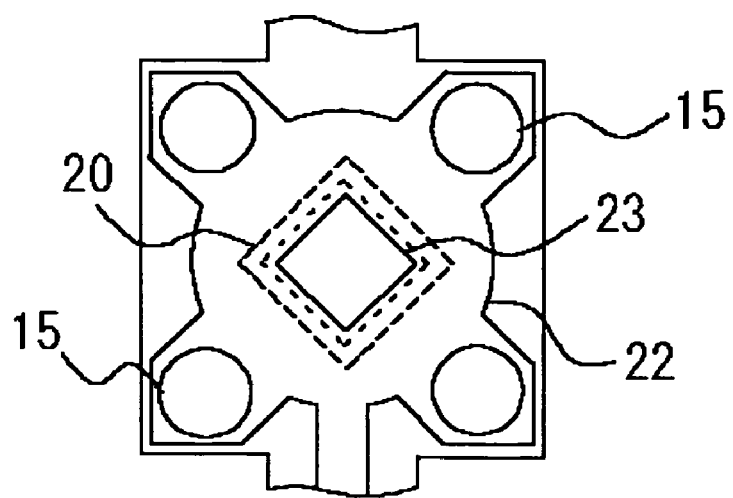

The closing portion 17 (see FIG. 8(h)) closing the release hole 15 is formed with an organic insulating film and a fabrication process therefor includes a procedure in which a resist of which the organic insulating film is formed is coated all over the surface and the resist on the release holes 15 and the vent hole section 5 are cured in exposure treatment and the closing portions 17 are formed in development treatment. Since a material of which the organic material film is made is soft prior to curing treatment, there arises a possibility that an organic material intruding through the vent hole 23 would further intrude into the cavity 10 of the sensor section 4 in a case where a straight communication path was formed between the vent section 5 and the sensor section 4. Therefore, by forming the communication path 24 between the vent hole section 5 and the sensor section 4 in a shape having plural bends, organic material can be prevented from intruding into the sensor section 4 from the vent hole section 5.

The communication path 24 in this embodiment has plural paths in a direction orthogonal to a direction along which the vent hole section 5 and the sensor section 4 are apart at the shortest distance (in this embodiment, coincides with extension of the second wire 3) and a direction of each portion is reversed by rotation of 180° at both ends of the portion to provide bends thereat. The release holes 15 are provided in the communication path 24 and an etching solution is injected through the release holes 15 to thereby enable the communication path 24 to communicate spatially through all the length with certainty and the release holes 15 are closed with the closing portions 17 after formation of the communication path 24 in a similar manner to that in the release holes 15 in the sensor section 4. Note that the communication path 24 is in a communication state after the release holes 15 are closed with the closing portions 17 as was before closing of the release holes 15.

Figure 13:
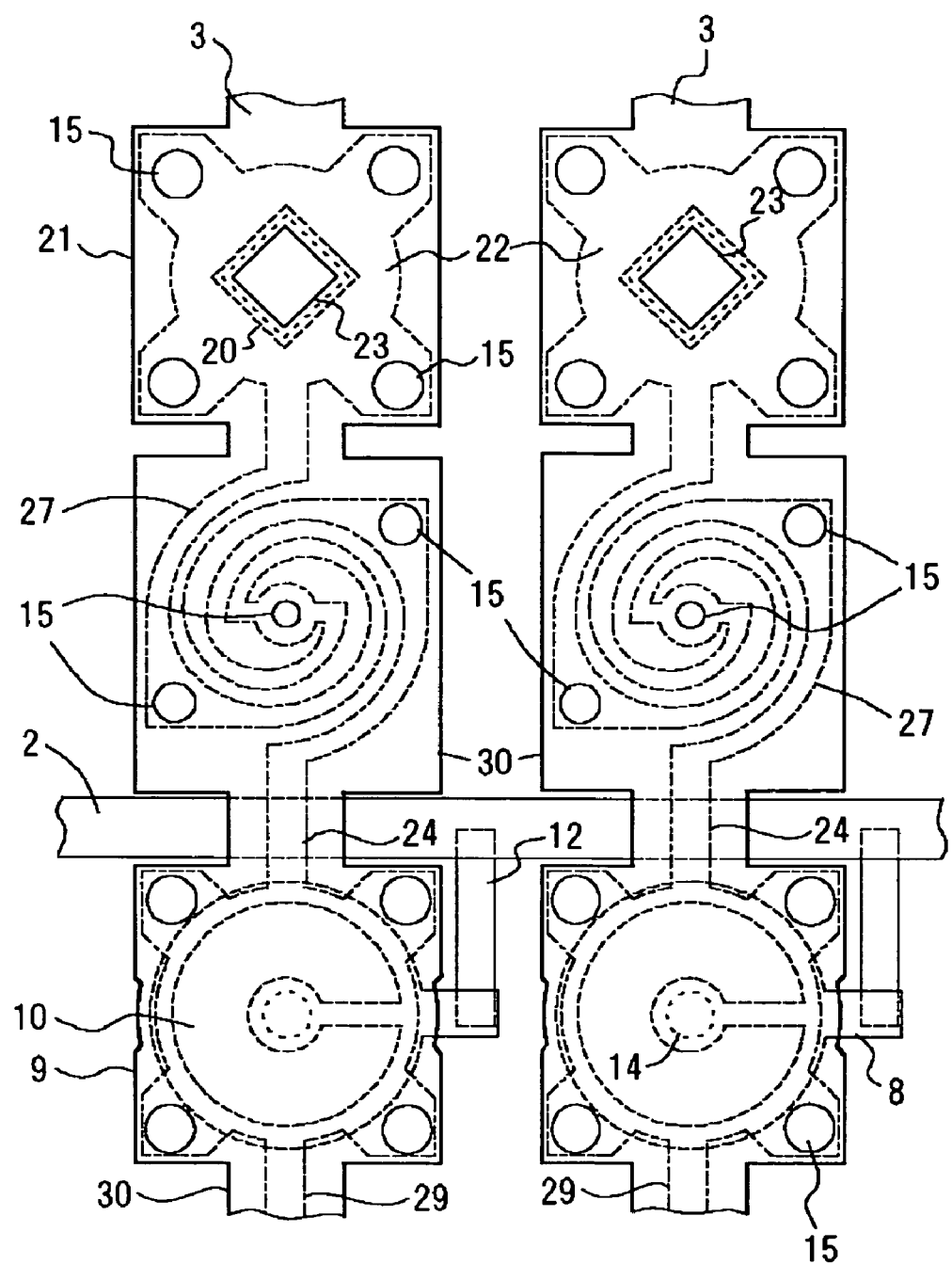
FIG. 13 is a plan view of a sensor section and a vent hole section of a pressure sensor according to a third embodiment of the present invention.

Then, description will be given of a third embodiment of the present invention with reference to the accompanying drawing. In this embodiment, a shape of the communication path 24 is different from that of the first embodiment while the other parts of the configuration are the same; therefore, description thereof will not be repeated herein. FIG. 13 is a plan view of the sensor section 4 and the vent hole section 5.

In this embodiment, the communication path 24 is formed in a spiral fashion and includes, from the vent hole section 5 to the sensor section 4: a first curved line portion winding five-fourths times in a clockwise direction while decreasing a diameter; the central portion where the first curved line reverses its rotation direction and which is connected to a second curved line portion; and the second curved line portion winding five-fourths times in a counterclockwise direction while increasing a diameter. The release holes are provided in the central portion, at a point in the vicinity of the middle in length of each of the curved line portions, respectively. Even if, in the communication path 24, an organic material of an organic insulating film or the like flows into the communication path 24, for example, through the vent hole section 5, the organic material can be stopped somewhere in the communication path 24, thereby enabling the organic material or the like to be prevented from flowing into the sensor section 4.

It is only required in this embodiment that not only can the vent hole section 5 as the vent hole 23 and the sensor section 4 communicate spatially with each other, but flowing-in of the organic material or the like to the sensor section 4 from the vent hole section 5 can also be stopped, and the communication path 24 is not specifically limited to the shapes adopted in the embodiment. For example, a level difference or the like such as a surface profile with depression and protrusion combined may be formed on the bottom surface of the communication path to thereby stop the organic material or the like with the level difference. A procedure for forming level differences is conducted such that plural protrusions are provided at plural sites on the first insulating film located in the future communication path, the intermediate layer to be used for the communication path is formed on the first insulating film including the protrusions and in the following step, the intermediate layer is removed to form the actual communication path. With such a procedure applied, level differences can be formed on the bottom surface of the communication path with simplicity.

Note that the embodiment is effective for a case where an organic insulating film or the like is formed after formation of the cavity in the sensor section 4. Therefore, while in this embodiment, description is given of a case where the release holes 15 are closed with an organic insulating film and the vent hole 23 is closed with SiNx, the embodiment is also effective for a case where the release holes 15 is closed with SiNx and the vent hole 23 is closed with an organic insulating film.

Figure 14:
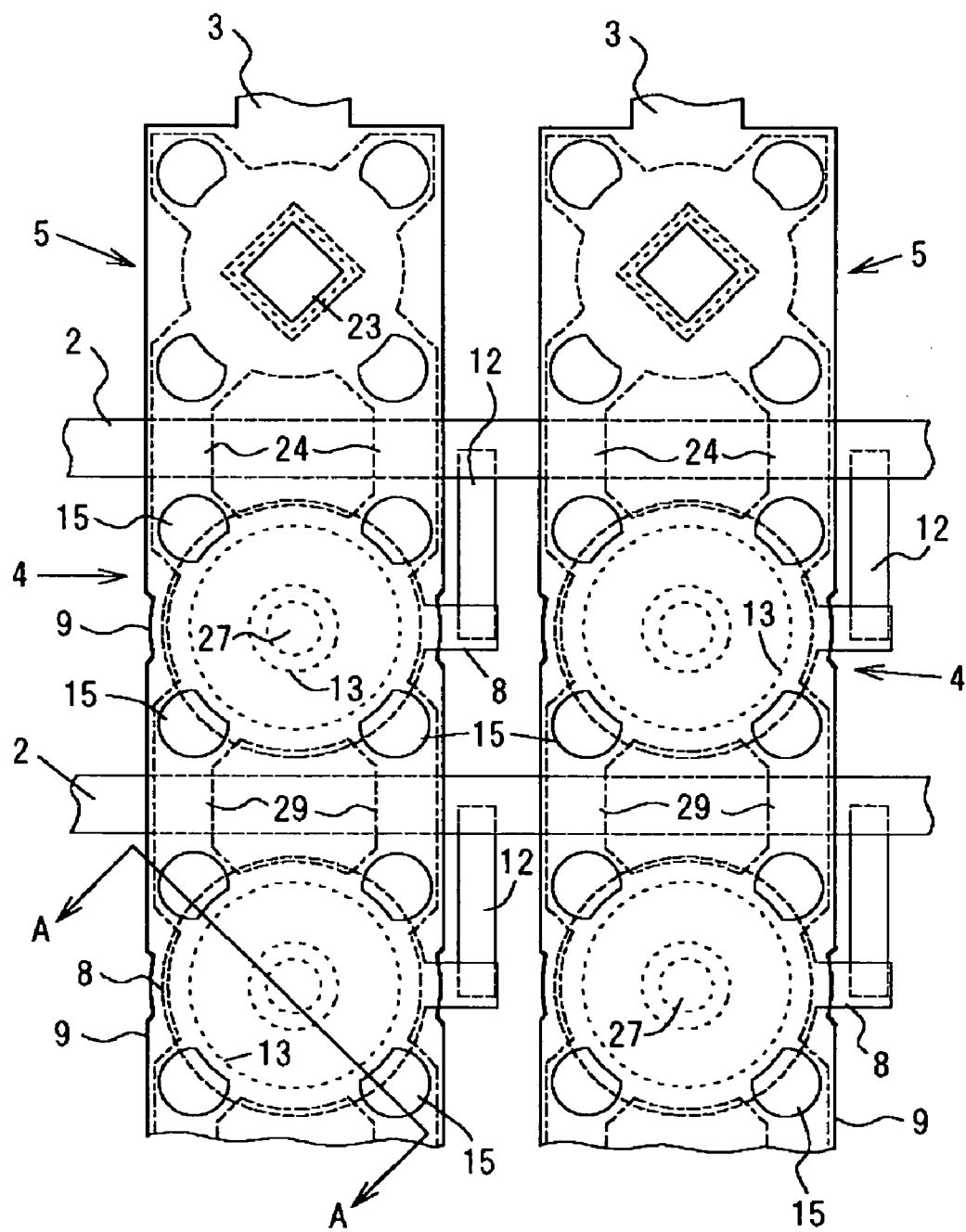
FIG. 14 is a plan view of a sensor section and a vent hole section of a pressure sensor according to a fourth embodiment of the present invention.
Figure 15:
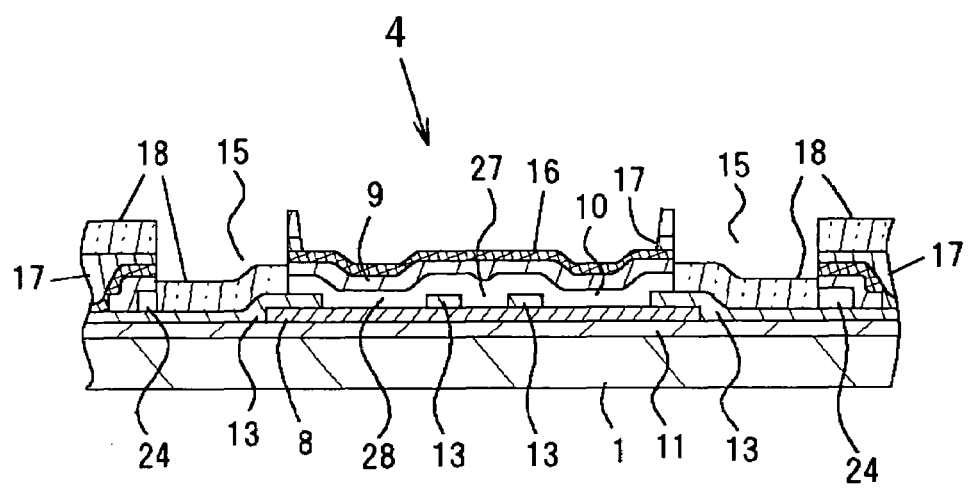
FIG. 15 is a schematic sectional view of the sensor section.
Figure 16:
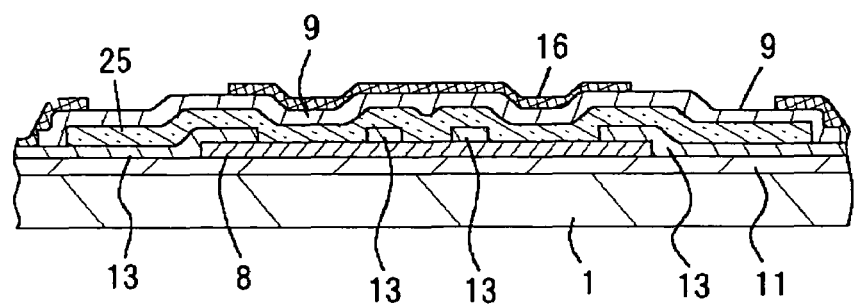
FIG. 16 is a sectional view for describing a step of a fabrication process for the sensor section.
Figure 17:
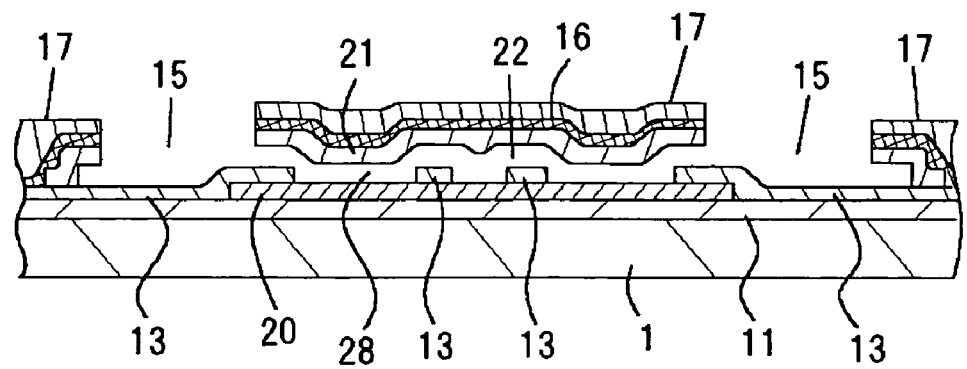
FIG. 17 is a sectional view for describing a step of a fabrication process for the sensor section.
Figure 18:
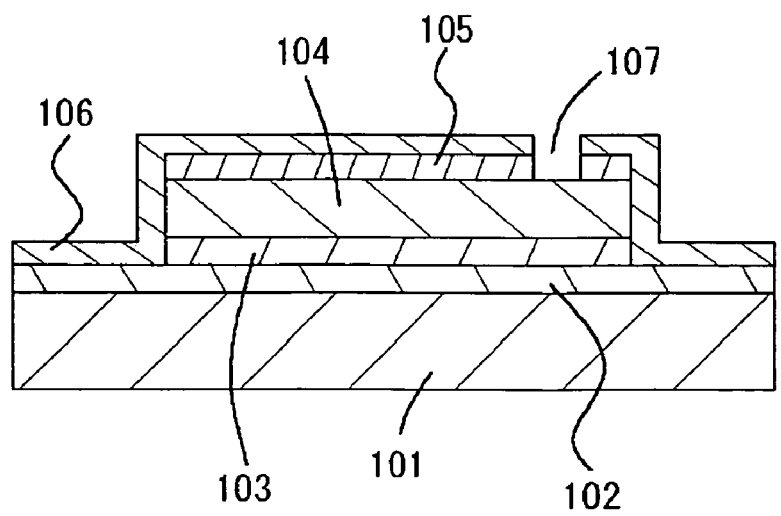
FIG. 18 is a sectional view showing a state of a conventional pressure sensor in a step of a fabrication process therefor.

Then, description will be given of a fourth embodiment of the present invention with reference to the accompanying drawings. FIG. 14 is a plan view of four (2×2) sensor sections 4 and a vent hole section 5 of FIG. 1, and FIG. 15 is a sectional view (of one sensor section only) taken along line A-A of FIG. 14. FIG. 16 is a sectional view showing a step of a fabrication process for the sensor section and FIG. 17 is a sectional view showing a step of removing an intermediate layer in the sensor section. A construction related to a glass substrate 1, a lower-layer insulating film 11 and first wires 2 are the same as in the first embodiment; therefore, description thereof will not be repeated herein.

A numerical symbol 8 indicates a first electrode disposed on the substrate 1, and the first electrode 8 has a disk-like land the center of which serves as a contact point portion. The first electrode 8 is of a layer structure made of, for example, Al and Mo and connected to the first wire 2 extending in the row direction through a contact layer 12 interposed therebetween. A construction of the contact layer 12 is the same as in the first embodiment; therefore, description thereof will not be repeated herein.

A numerical symbol 9 indicates a second electrode disposed opposite to the first electrode 8 with a cavity 10 interposed therebetween and serves additionally as a second wire 3 in the column direction. The cavities 10 between the first electrodes 8 and the second electrodes 9 communicate with each other in the respective column directions in the respective sensor sections 4 through two communication portions 29 for each column and are open in the outside air. The second electrode 9 is made of, for example, Mo and is, as seen within each sensor section 4, in the shape of almost a tetragon, the periphery thereof is sufficiently remote from the outline of the first electrode 8 and release holes 15 are provided at the four corners thereof. In this embodiment of the figure, the second electrode 9 substantially determines a size of the sensor section 4 and the size is, for example, a square of 50 μm×50 μm per one contact point sensor.

The release holes 15 are holes used for removing the intermediate layer 25 described later and cavities of two release holes 15 are provided on both ends of the communication portion 29. The release holes 15 are provided in the second electrode 9 in a procedure as described below, while the release holes 15 may be provided on a coat separately formed for providing the release holes. Plural release holes 15 are preferably provided for one sensor section in order to etch off the intermediate layer 25 with certainty and uniformity, and each of the other sensor sections are also preferably provided in the same way, and in FIG. 14, four release holes are provided for one sensor section and two release holes are provided to each communication path extending in the column direction at sites upwardly from and in the vicinity of the outline of the first electrode.

Since the release holes 15 are located near the contact point region 27, dust or liquid intrudes into the cavity 10 through the release holes 15 if the holes are open in the outside air, leading to a possibility of troubles such as contact fault. Therefore, it is desired that the release holes 15 are finally closed by the insulating film 17 or the like described later. In the case, the first electrode 8 cannot be observed from the release holes 15 even if the release holes 15 are above the first electrode 8.

A numerical symbol 13 indicates a first insulating film stacked on the first electrode 8. The first insulating film 13 is in the shape of two rings disposed concentrically and covers the lower-layer insulating film 11 and a main part of the first electrode 8. The first insulating film 13 is made of, for example, SiNx, SiO$_2$ or the like. The central portion that is not covered with the first insulating film 13 formed inside and in which the first electrode 8 is exposed serves as the contact point region 27 functioning as a contact point. A numerical symbol 16 indicates a second insulating film, and the second insulating film 16 may work so that the second electrode 9 is simply not exposed to the outside air or, alternatively, may works so as to reinforce or support the second electrode 9. Numerical symbols 17 and 18 indicates insulating films required for a reason associated with a step or for adjusting a stress.

Then, brief description will be given of steps of a fabrication process for a pressure sensor 4. The steps of forming the lower-layer insulating film 11, the first wire 2, the first electrode 8, the intermediate layer 25 and the second electrode 9 are the same as those in the first embodiment; therefore, description thereof will not be repeated herein.

The second insulating film 16 is formed as an overcoat film on the second electrode 9. A photosensitive polyimide of which the second insulating film 16 is made is coated on the substrate 1 using a spinner to obtain a uniform film. The organic film in portions except portions where the release holes 15 are formed are cured in exposure treatment. Then, uncured portions corresponding to the release holes 15 are removed in development treatment. This state is shown in FIG. 15. While the second insulating film 16 is also formed in portions other than the second electrode 9, the second insulating film 16 may also be formed only on the second electrode 9.

Then, SiNx is stacked on the second insulating film 16 to form the insulating film 17. Then, removed is SiNx layered in portions corresponding to the release holes 15. A method for forming a release hole is the same as that in the first embodiment; therefore, description thereof will not be repeated herein.

Then, etching treatment is performed in order to remove only the intermediate layer 25. A method for performing the etching treatment is the same as that in the first embodiment; therefore, description thereof will not be repeated herein. In the present invention, etching advances not only in the direction toward the first electrode 8 from the release holes 15 but also in the direction toward another release hole adjacent to one release hole forming a communication portion 29 to thereby form an opening and communicate with each other; therefore, the etching solution smoothly flows to increase an etching speed, uneven etching is suppressed and etching residue is harder to be left. In addition, two communication portions 29 are provided between adjacent sensor sections 4; thereby enabling more uniform etching to be realized.

Thereafter, SiNx or the like is stacked on the insulating film 17 to form an insulating film 18 serving as a protective film. In this step, since neither the second insulating film 16 nor the insulating film 17 exists in the release holes 15 in a similar manner to that in the first embodiment, the insulating film 18 is stacked to close the release holes 15. By closing the release holes 15, dust can be prevented from intruding into the cavity 10 through the release holes 15, whereas since the cavity 10 communicates with the vent hole section 5, pressures in the cavities 10 of the sensor sections 4 can be the same as that in the outside air. Since air pressures in the sensor sections are uniform by connecting spatially adjacent sensor sections therebetween, no large load is imposed on the second electrode 9 of the sensor section 4 in a step of creating a vacuum, thereby enabling breakage thereof to be prevented.

Since the release holes 15 are formed at the communication portion 29, closing of the larger release holes 15 has a possibility to close or narrow the communication portion 29. If the cavity 10 is sufficient large, however, no problem occurs in operation to close contact points and since during such a operation, a large flow of air is unnecessary in the communication portion 29, one of the plural communication portions 29 is only required to be left partly unclosed so as to allow a small flow of air. Since deposition to close the release holes 15 has no spatial allowance to be deformed or spread, the communication portion 29 in the vicinity of the release holes 15 has only to be slightly expanded. Note that the insulating films 17 and 18 are partly removed in a circle, a tetragon or the like on the second electrode 9. This is because the second electrode 9 is easier to be curved by removing the insulating films 17 and 18.

Note that the vent hole section 5 can be formed simultaneously with the sensor sections 4 in almost the same step and the vent hole 23 has only to be provided instead of the contact point region 27 in the center of a sensor section 4. When the pressure sensor section is completed, the vent hole 23 is preferably closed, in which case the vent hole 23, after the process covering various kinds of steps, can be closed with a sealing material made of photosensitive polyimide resin and others.

Since in the present invention, the second electrodes 9 of the sensor sections 4 works as the second wire 3 in addition to its essential role, no necessity arises for a special space to place the second wire 3, thereby enabling the sensor sections 4 can be configured at a higher density due to the absence of the special space. Therefore, a proportion occupied by the sensor sections 4 increases in the pressure detection region, leading to increase in resolution. Since the second electrodes 9 and the connection portions 30 are simultaneously formed by patterning the same metal layer, the connection portions can be formed in a simple process.

While, in the present invention, the second electrodes 9 play a second role as the second wire 3, the first electrode 8 may also play a second role as the first wire 2. In the latter case, a metal layer is stacked on the lower-layer insulating film 11 and in patterning the first electrodes 8, connection portions are formed in a manner such that the first electrodes 8 of the sensor sections 4 disposed along one row direction are connected electrically to one another. Since in this case, the first wire 2 is formed with the first electrodes 8 and the connection portions, a specially secured space for the first wire 2 can be saved. The second wire 3 in this case may be of a construction including the second electrodes 9 and the connection portions 30 in a similar manner to that in the embodiment or, alternatively, the second wire is provided on sides of the sensor sections 4 and the second wire may connected to the second electrodes 9.

A pressure sensor of the present invention detects whether or not a scanning signal supplied onto a first wire 2 flows in a second wire 3 through both electrodes 8 and 9 and a pattern of a specimen is detected based on the results of detection of the scanning signal. Therefore, the first electrode 8 and the first wire 2 in the sensor section 4 are preferably connected therebetween by a member higher in resistance than the first wire 2 since a scanning signal flowing in a second wire 3 is prevented from flowing into another second wire 3 through a second wire 2 onto which no scanning signal is supplied; thereby enabling erroneous detection to be prevented. Therefore, when electrodes in the sensor sections 4 play second roles as wires, a pressure sensor with less of erroneous detection can be attained by adopting a configuration in which the second electrodes 9 work as the second wire 3 onto which no scanning signal is supplied.

The most horizontal possible surface of the second electrode 9 in the sensor section 4 enables the most correct detection to be achieved. Since the surface of the second wire 3 is raised in a portion where the first wire 2 is superimposed on the second wire 3, such a portion of the superimposition is not suitable for forming the sensor section 4. The sensor sections 4 may be better located in portions other than portions where both wires 2 and 3 are superimposed on each other.

While in the present invention, the connection portions 30 are formed in the same step as the second electrodes 9 in the sensor sections 4, the connection portions may also be formed in a different step from a step for the second electrodes 9. In the latter case, the connection portions may also be formed on a layer different from the layer as the second electrodes 9, and for example, contact holes are formed in the second insulating film 16 on the second electrodes 9, conductive connection portions are formed on the second insulating film 16 and the connection portions may also be connected to the second electrodes 9 through the contact holes.

While in the present invention, the dummy electrode 20 or the like in the vicinity of the vent hole 23 in the vent hole section 5, an insulating layer may also be provided in the vicinity of the vent hole 23 instead of the dummy electrode 20 since a construction is only required in which the vent hole 23 is not closed while the release holes 15 in the sensor sections 4 are closed.

While in the present invention, the first insulating film 13, which is an insulating film, and the second wire 3, which is a metal layer, are used to form the inner walls of a communication path 24 connecting the cavity 10 of a sensor section 4 and the second cavity 22 of a vent hole section 5 therebetween and communication portions 29 to cause the cavities of the sensor sections 4 to communicate with one another, the communication paths 24 and communication portions 29 may be formed with the lower-layer insulating film and the upper-layer insulating film surrounding the paths since the cavities have only to communicate spatially with one another through the communication paths 24 and communication portions 29.

A way of closing the release holes 15 may be either a method in which a film is deposited in portions including the release holes 15 or, for example, a method in which a sheet-like film may also be adhered to the release holes 15. After the release holes 15 and the vent holes 23 are perfectly closed with an insulating film or the like, a process may also be adopted in which the vent hole 23 is opened to thereby cause the cavities 10 to communicate spatially with the outside air.

While in the above description, the vent hole portions 5 are disposed along the second wire 3 to thereby communicate with the cavities 10 of the sensor sections 4 disposed in one column direction, a construction may also be adopted in which not only are the communication paths 24 formed in one row direction, but vent hole sections 5 are also disposed in one row direction and thereby the vent hole sections 5 may also be caused to communicate with the cavities 10 of the sensor sections 4 disposed in the one row direction.

While in the present invention, description is given of the pressure sensor for detecting a pressure based on the presence/absence of contact between electrodes of a pair in the sensor section 4, the present invention is effective for a pressure sensor of any type having cavities in the sensor sections and can be applied to, for example, an electrostatic capacity type sensor.

INDUSTRIAL APPLICABILITY

The present invention can provide a pressure sensor having plural sensor sections, in each of which a first electrode and a second electrode are disposed opposite to each other with a cavity interposed therebetween, which plural sensor sections are arranged in a pressure detection region, including: a vent hole section provided separately from the sensor sections and, also, having a vent hole on a surface thereof; and communication paths causing the cavities in the sensor sections to communicate with the vent holes of the vent hole sections, thereby enabling a pressure sensor preventing breakage of a sensor section and improving a product yield even in a case where the pressure sensor is placed to a vacuum in a fabrication process thereof.

While in a case where a release hole and a vent hole are closed with an organic insulating film or the like, the organic material or the like flows in through the vent hole section, a connection portion between a sensor section and the vent hole section is bent in a zigzag fashion or a spiral fashion to thereby enable the organic material to be prevented from intruding into as far as the cavity in the sensor section, thereby enabling defective sensor sections generated in a fabrication process to be reduced and in turn, further a product yield to be increased.

A circular release hole can be closed with certainty, while a polygonal vent hole can prevent it from occurring that as far as the vent hole is closed while the release hole is closed.

By providing the release holes at the communication portions communicating the cavities of the sensor sections, the intermediate layer can be efficiently removed without unevenness.

By electrically connecting the first electrodes to the second electrodes respectively in adjacent sensor sections and using the connected electrodes of the same kind as part of a wire, no necessity arises for a special space dedicated to the wire, thereby enabling sensor sections to be arranged at a higher density, and in turn, further resolution to be improved.

The invention claimed is:

1. A pressure sensor comprising:
   plural first wires and plural second wires intersecting with each other in arrangement; and
   plural sensor sections provided in the vicinities of the intersections of the first and second wires,
   wherein each of the sensor sections includes a first electrode and a second electrode, which is formed to bend toward the first electrode when a pressure is applied to the sensor section, at least a portion of the first and second electrodes are disposed directly opposite each other with only a cavity interposed therebetween, the plural sensor sections are arranged in a pressure detection region, and communication portions are provided between the cavities in the respective sensor sections to communicate spatially with each other and are disposed along a column direction, with a release hole provided at each of the communication portions.

2. The pressure sensor according to claim 1, wherein the communication portions are provided between adjacent sensor sections.

3. The pressure sensor according to claim 1, wherein each of the sensor sections has at least one circular release hole defined in an insulating film.

4. The pressure sensor according to claim 1, wherein the communication portions are made of the same material and at the same time as the second electrode.

5. The pressure sensor according to claim 1, wherein the sensor sections are disposed on the second wires between the first wires.

6. The pressure sensor according to claim 1, wherein the second electrodes of adjacent sensor sections are electrically connected to each other.

7. The pressure sensor according to claim 1, wherein the first electrodes of adjacent sensor sections are electrically connected to each other.

8. A pressure sensor provided with plural sensor sections in each of which a first electrode and a second electrode are disposed opposite to each other with a cavity interposed therebetween, the plural sensor sections being arranged in a pressure detection region, the pressure sensor comprising:
   a plurality of vent hole sections provided outside the pressure detection region, the vent hole sections each having a vent hole at a surface thereof and a second cavity inside; and
   a plurality of communication paths for facilitating communication between the cavity of each sensor section spatially with the second cavity of a corresponding vent hole sections, wherein each communication path has a bend formed therein.

9. The pressure sensor according to claim 8, wherein said each communication path is formed in a zigzag fashion.

10. The pressure sensor according to claim 8, wherein said each communication path is formed in a spiral fashion.

11. The pressure sensor according to claim 8, wherein each of the sensor sections has a circular release hole penetrating through a film serving as an upper surface of the cavity.

12. The pressure sensor according to claim 8, wherein the vent hole section has a polygonal vent hole penetrating through a film serving as an upper surface of the vent hole section.

13. The pressure sensor according to claim 8, wherein at least one inner surface of said each communication path is formed with the same material as one of the first and second electrode of the corresponding sensor section.

14. The pressure sensor according to claim 8, wherein an inner surface of the communication path is made of an insulating film.

15. The pressure sensor according to claim 8, wherein the second electrodes of adjacent sensor sections are electrically connected to each other.

16. The pressure sensor according to claim 8, wherein the first electrodes of adjacent sensor sections are electrically connected to each other.

17. A method for fabricating a pressure sensor provided with plural sensor sections each having a cavity in arrangement, and a communication portion causing the cavities of adjacent sensor sections to communicate spatially with each other, the method comprising the steps of:
   stacking a first metal layer on a substrate to form a first electrode at a site corresponding to a sensor section;
   stacking a first insulating film on the first electrode;
   removing part of the first insulating film to expose a central portion of the first electrode;
   stacking an intermediate layer formed with a second metal layer on the first insulating film;
   patterning the intermediate layer to leave behind the central portions of the sensor sections and portions corresponding to communication portions;
   stacking a third metal layer on the intermediate layer to pattern the third metal layer so as to cover at least the intermediate layer on the sensor sections and the communication portions and to form the second electrode in the sensor sections;
   forming a second insulating film on the second electrode;
   removing parts of each of the second electrode and the second insulating film positioned on the intermediate layer to form release holes of the sensor sections;
   removing the intermediate layer through the release holes to form the cavities in the sensor sections and the communication portions; and
   closing the release holes with an insulating film.

* * * * *